US011818227B1

(12) United States Patent
Kumar et al.

(10) Patent No.: US 11,818,227 B1
(45) Date of Patent: Nov. 14, 2023

(54) APPLICATION USAGE ANALYSIS-BASED EXPERIMENT GENERATION

(71) Applicant: Amazon Technologies, Inc., Seattle, WA (US)

(72) Inventors: Sudhir Kumar, Bothell, WA (US); Mitun Lahiri, San Jose, CA (US); Victoria Gritton, Santa Clara, CA (US); Daniel E. Nations, Seattle, WA (US); Varsha Velagapudi, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/657,570

(22) Filed: Mar. 31, 2022

(51) Int. Cl.
*G06F 15/173* (2006.01)
*H04L 67/50* (2022.01)
*H04L 41/16* (2022.01)
*H04L 67/75* (2022.01)

(52) U.S. Cl.
CPC ............ *H04L 67/535* (2022.05); *H04L 41/16* (2013.01); *H04L 67/75* (2022.05)

(58) Field of Classification Search
None
See application file for complete search history.

(56) References Cited

U.S. PATENT DOCUMENTS

| | | | | |
|---|---|---|---|---|
| 2009/0327482 | A1* | 12/2009 | Malhotra | G06F 15/173 709/224 |
| 2010/0218179 | A1* | 8/2010 | Balascio | G06F 8/65 717/171 |
| 2019/0095320 | A1* | 3/2019 | Biswas | G06F 21/577 |
| 2019/0265971 | A1* | 8/2019 | Behzadi | G06F 16/288 |
| 2020/0128047 | A1* | 4/2020 | Biswas | H04L 67/10 |
| 2020/0311600 | A1* | 10/2020 | Kulkarni | G06F 8/71 |
| 2021/0042638 | A1* | 2/2021 | Novotny | G06N 20/00 |
| 2022/0023755 | A1* | 1/2022 | Vukojevic | H04L 67/63 |
| 2022/0067106 | A1* | 3/2022 | Saez | G06F 9/5072 |
| 2023/0022477 | A1* | 1/2023 | Livne | G06F 8/65 |

OTHER PUBLICATIONS

U. K. Deekonda and S. B. Tolety, "A Study on an Agent Based Approach to Monitor the Application Feature Usage," 2014 Fourth International Conference on Advances in Computing and Communications, Cochin, India, 2014, pp. 251-254, doi: 10.1109/ICACC.2014.67. (Year: 2014).*

* cited by examiner

*Primary Examiner* — Yves Dalencourt
(74) *Attorney, Agent, or Firm* — Knobbe, Martens, Olson & Bear, LLP

(57) ABSTRACT

Systems and methods are provided for evaluation of application interactions and associated metadata to manage application feature experiments, use of synthetic traffic ("canaries"), and the like. Data regarding application interactions and associated application metadata may be evaluated to identify usage patterns and conditions associated with desired actions, and usage patterns and conditions associated with undesired actions. Identifying such usage patterns and conditions can facilitate prediction of future actions given some set of observed application interactions and application metadata. Such predictions can be leveraged to perform experiments that optimize the occurrence of desired actions, and implement canaries to determine the effect of various user journeys and application data on desired actions.

20 Claims, 12 Drawing Sheets

US 11,818,227 B1

APPLICATION USAGE ANALYSIS-BASED EXPERIMENT GENERATION

CROSS-REFERENCE TO CONCURRENTLY-FILED APPLICATIONS

This application is being filed concurrently with the following U.S. Applications, each of which is incorporated by reference in its entirety and made part of this specification:

| U.S. application Ser. No. | Title | Filing Date |
| --- | --- | --- |
| 17/657,583 | DYNAMIC USAGE-BASED SEGMENTATION | Mar. 31, 2022 |
| 17/657,597 | STREAMING ANALYSIS-BASED EXPERIMENT MANAGEMENT | Mar. 31, 2022 |

BACKGROUND

Computing devices can utilize communication networks to exchange data. One computing device (the source computing device) transmits data to another computing device (the destination computing device). In a common scenario, the data may represent multimedia content, application content, etc. Users may interact with the content, and data may be transmitted back to the source device or to another device.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
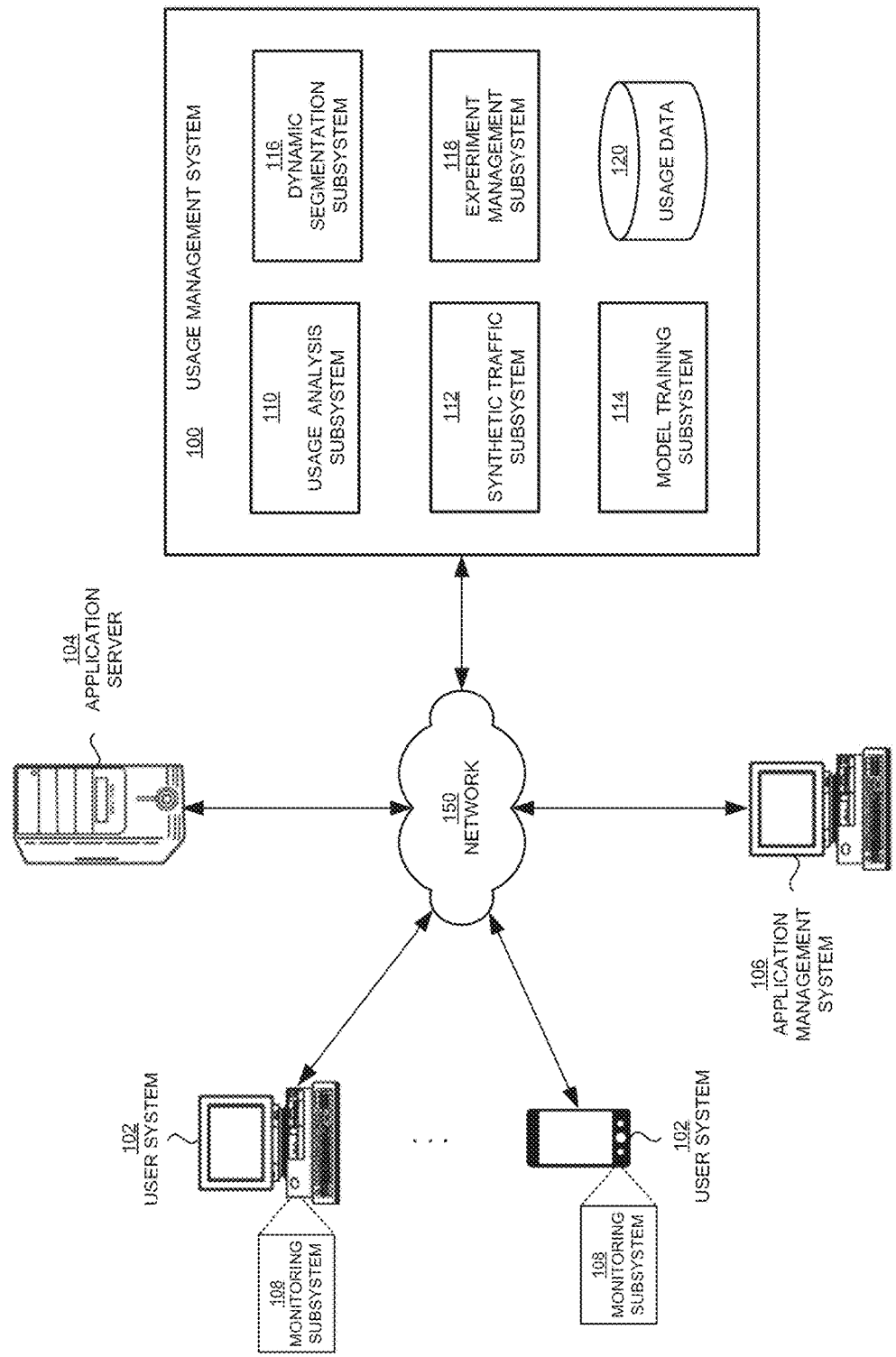
FIG. 1 is a block diagram depicting an illustrative usage management system in communication with user systems, an application server, and an application management system according to some embodiments.

The present disclosure relates to evaluation of application interactions and associated metadata to manage application feature experiments, rollouts, and the like. Data regarding application interactions and associated application metadata may be evaluated to identify usage patterns and conditions associated with desired actions (e.g., maintaining or increasing use of application, completion of operations, etc.), and usage patterns and conditions associated with undesired actions (e.g., decreasing or stopping use of application, failure to complete operations, etc.). Beneficially, identifying such usage patterns and conditions facilitates prediction of future actions given some set of observed application interactions and application metadata. Such predictions can be leveraged to perform experiments that optimize the occurrence of desired actions, test rollouts of features to determine their effect on desired actions, and the like. Data regarding application interactions and associated application metadata (collectively referred to herein as "application usage data" or simply as "application data") may also or alternatively be evaluated to discover segments of users and/or usage patterns. Such segments may be leveraged to dynamically segment traffic and determine user cohorts to more effectively perform feature experiments and manage feature rollouts. Streaming application data generated during performance of feature experiments may be evaluated to produce statistically sound metrics, even in real-time or substantially real-time. Thus, the systems and methods described herein can beneficially provide for effective feature experimentation and rollouts with dynamic segmentation and "anytime" metrics.

Some conventional systems track usage of applications to determine the sets of interactions that users perform within the applications (e.g., paths or journeys). However, such paths or journeys alone may not reveal the underlying usage patterns and conditions that are most associated with desired or undesired actions. In addition, some conventional systems segment users for purposes of customized features, content, and the like based on demographic and/or usage data typically collected during use, such as location, browser settings, purchase behavior, etc. However, use of this typically-collected data may be limiting and may prevent a system from uncovering and leveraging other usage patterns that may be revealed from analysis of usage metadata not traditionally used to segment users. For example, patterns in search terms and their correlation to desired application actions may not be discovered and leveraged using only typically-collected demographic and usage data. Moreover, conventional systems evaluate the results of an experiment based on data collected throughout the experiment, waiting until the end of the experimental period to produce statistically-valid results. However, waiting until the end of a lengthy experiment (e.g., weeks or months) can cause undesirable delays to use of the results of the experiment.

Some aspects of the present disclosure address some or all of the issues noted above, among others, by collecting data regarding usage of an application and collecting metadata regarding performance conditions associated with use of the application (e.g., search accuracy, page responsiveness, network delay etc.). This application data may be evaluated and tagged as being associated with desired actions (e.g., completion of a particular operation) and/or undesired actions (e.g., abandonment of an application session due to a threshold period of inactivity). In some embodiments, synthetic traffic may be used to mimic usage patterns of real users based on operations predicted using machine learning. For example, programmatic users ("bots") may access the application and perform various actions to simulate actual users' interactions with the application. Data regarding usage and metadata regrading associated performance conditions may be collected in a manner that is the same as or similar to that of real users. This synthetic traffic may serve as a "canary" to detect conditions in which an increased risk of undesirable actions is present, even when users are not currently accessing the applicable portions of the application. Machine learning may be used to identify, based on application data associated with application sessions of real users and/or application data associated with canaries, when users are likely to perform desired and/or undesired actions. The collection of such data and evaluation with machine learning models can allow a system to recommend features and/or experiments. In some embodiments, a system can recommend changes to application features that may increase desired actions and/or reduce undesired actions, experiments to determine how to increase desired actions and/or reduce undesired actions, synthetic traffic to be generated as canaries, and the like. For example, in the presence of certain usage patterns and associated conditions, it may appear that users are more likely to perform a desired action when presented with one particular content item than another content item. An experiment may be generated or recommended to test this hypothesis, and potentially further refine the specific conditions and interactions that lead to the desired action. In some embodiments, the predictions of potential desired and undesired actions may be used to evaluate application interfaces and structures. For example, some portions of an application may tend to be associated with undesirable actions under certain conditions, and uncovering such correlations can aid in application development and enhancement.

Additional aspects of the present disclosure relate to dynamic segmentation of users and/or user traffic for feature experiments, rollouts, etc. Rather than using only demographic or typical user interaction data (e.g., purchase behavior, content browse behavior, etc.), a system may use additional application data regarding end user attributes, actions, context, and the like. For example, an application may provide transaction management. In addition to collecting information regarding a performed transaction (e.g., transaction time, transaction type, etc.), the application may collect additional data such as the search terms used during use of the application. With this additional information, user traffic associated with those same search terms and time of use can be dynamically segmented into an experiment segment, also referred to as a cohort. An experiment may be executed to recommend, as the top search result to this cohort, an item associated with transactions that have been completed when those search terms are used at that time of day. Moreover, the data used to segment traffic may be dynamically modified (e.g., expanded, supplemented, substituted, etc.) such that different segments may be used over the course of a given experiment without requiring segment definitions at the beginning of an experiment for all segments used throughout the duration of the experiment. In some embodiments, additional or otherwise different sets of segments may be identified to form the basis of additional or otherwise different user cohorts. In some embodiments, traffic and/or users that are originally determined to be in one cohort may, later in an experiment, be determined to be in a different cohort. Data defining useful segments (e.g., segments for which an experiment has shown positive results) may be stored in a dictionary (e.g., a segment dictionary or cohort dictionary) that may be accessed to re-use cohorts, spot additional behaviors, create new cohorts, and the like.

Further aspects of the present disclosure relate to streaming analysis of experiment data. Application data generated during the course of an experiment may represent various events occurring during a user's use of an application, and the conditions associated with those events. Such application data is also referred to herein as "event data." For example, event data for a particular event may include data representing one or more actions associated with the event, one or more properties of a user or item, one or more contextual data points regarding the context of the event, other data, or some combination thereof. Such event data may be generated for two or more feature variants being tested (e.g., a control group and a treatment group, multiple treatment groups, etc.). Rather than waiting for the experiment to conclude before evaluating event data for all events of the experiment, the event data may be evaluated in a streaming manner as each item of event data is received. In some embodiments, one or more statistics may be generated from an obtained event data item and some or all previously-received event data items in an event data stream (where the one or more statistics include, for example, the mean, median, mode, variance, etc. for an observed metric of interest). In addition to the one or more statistics, confidence information may be generated to represent a confidence that an observed difference in the statistic (e.g., the difference in the statistic computed for the control set and the statistic computed for the treatment set) corresponds to a difference in the statistic that would be generated from all event data received over the course of an entire experiment. This approach may be referred to as a frequentist approach, and the confidence information may be a p-value. In some embodiments, the confidence information may be or include a confidence interval, such as a range of likely final differences in the statistic to a threshold degree of probability (e.g., where the threshold degree of probability is a relative high value, such as 90%, 95%, 99%, etc.). A larger range of likely differences may indicate a lower confidence in the current difference than a smaller range. Moreover, the confidence information may be used to determine whether and when to end an experiment before its planned stopping point. For example, an experiment may be designed to test a "null hypothesis" that differences in a particular feature of an application do not result in any difference to a particular metric. The difference in the statistic may reflect differences in the metric and therefore may reflect observed differences in the feature. A p-value—determined for the null hypothesis—that falls below some confidence threshold (e.g., 0.05, 0.01, etc.) is indicative of a low likelihood that any observed difference is due to random chance in the available sample. Thus, the analysis may proceed with a high degree of confidence that the observed difference is not due to random chance in the available sample. A confidence interval that includes "0" as a possible value for the statistical difference between variants indicates that the null hypothesis may still hold. However, as an event data stream continues to be processed and statistics continue to be generated, the confidence interval may change in upper bound, lower bound, and/or magnitude of range between upper and lower bounds. When the confidence interval does not include "0" as a possible value for the statistical difference, then the null hypothesis may be determined to be unlikely to hold and the experiment may be ended. Advantageously, use of such streaming analysis and confidence information may allow for experiment duration reductions on the order of 10%, 25%, 33%, 50%, or more.

In some embodiments, additional and/or alternative analyses may be performed, such as Bayesian analysis to generate distributions that may be queried for information not available under a frequentist analysis. The intuitive probabilities of increase or decrease from Bayesian analysis may still be used to determine how likely an improvement in a variation is, even if the desired confidence level from the frequentist analysis is not reached.

Various aspects of the disclosure will now be described with regard to certain examples and embodiments, which are intended to illustrate but not limit the disclosure. Although aspects of some embodiments described in the disclosure will focus, for the purpose of illustration, on particular examples of application interactions, actions, events, metadata, segments, statistical analyses, and machine learning algorithms, the techniques described herein may be applied to additional or alternative interactions, actions, events, metadata, segments, statistical analyses, machine learning algorithms, and the like. Any feature used in any embodiment described herein may be used in any combination with any other feature, without limitation.

Example Network Environment and Usage Management System

With reference to an illustrative embodiment, FIG. 1 shows an example network environment in which aspects of the present disclosure may be implemented. In some embodiments, as shown, the network environment may include a usage management system 100, any number of user systems 102 (also referred to as "user devices"), an application server 104, and an application management system 106 (also referred to as an "application manager"). The usage management system 100, user systems 102, application server 104, and application management system 106 may communicate with each other via one or more communication networks 150.

In some embodiments, a communication network 150 (also referred to simply as a "network") may be a publicly-accessible network of linked networks, possibly operated by various distinct parties, such as the Internet. In some cases, the network 150 may be or include a private network, personal area network, local area network, wide area network, global area network, cable network, satellite network, cellular data network, etc., or a combination thereof, some or all of which may or may not have access to and/or from the Internet.

The usage management system 100 may be a logical association of one or more computing devices for ingesting application interaction data and associated application metadata, analyzing the ingested data, and managing application feature experiments and/or rollouts. For example, the usage management system 100 may include a usage analysis subsystem 110 for analyzing application data, a synthetic traffic subsystem 112 for generating and managing synthetic traffic that may generate application data, a model training subsystem 114 for training machine learning models to analyze application data, a dynamic segmentation subsystem 116 for segmenting application traffic and users, an experiment management subsystem 118 for managing feature experiments, and a usage data store 120 to store application data that is ingested by the usage management system 100.

The usage management system 100 (or individual components thereof, such as the usage analysis subsystem 110, the synthetic traffic subsystem 112, the model training subsystem 114, the dynamic segmentation subsystem 116, the experiment management subsystem 118, the usage data store 120, etc.) may be implemented on one or more physical server computing devices. In some embodiments, the usage management system 100 (or individual components thereof) may be implemented on one or more host devices, such as blade servers, midrange computing devices, mainframe computers, desktop computers, or any other computing device configured to provide computing services and resources. For example, a single host device may execute one or more usage analysis subsystems 110, synthetic traffic subsystems 112, model training subsystems 114, dynamic segmentation subsystems 116, experiment management subsystems 118, usage data stores 120, some combination thereof, etc. The usage management system 100 may include any number of such hosts.

In some embodiments, the features and services provided by the usage management system 100 may be implemented as web services consumable via one or more communication networks. In further embodiments, the usage management system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

A user system 102 may be any of a wide variety of electronic devices with content presentation and/or application execution capabilities, including personal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances. Some or all of the user systems 102 may include a monitoring subsystem 108 that monitors application usage by a user system 102 and reports such application usage (e.g., as application interaction data, application metadata, etc.) to the usage management system 100 via network 150. In some embodiments, the monitoring subsystem 108 is a library of executable code referenced by or embedded within network resources (e.g., web pages) requested via a web browser executing on the user system 102. In some embodiments, the monitoring subsystem 108 is a component of application software executing on a user system 102.

The application server 104 may be any of a wide variety of computing devices with application execution, content storage, and network communication capabilities for providing a network-based application, such as a web site or server-side of an application with a client-side component executing on user systems 102. In some embodiments, the application server 104 may be may be implemented on one or more host devices, such as blade servers, midrange computing devices, mainframe computers, desktop computers, or any other computing device configured to provide computing services and resources.

The application management system 106 may include any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. The application management system 106 may provide processing and network communication capabilities to facilitate management of the network-based application hosted by or otherwise provided by the application server 104. In some embodiments, a user of the application management system 106 may be an application administrator or technician, and may use the application management system 106 to access the analysis results generated by the usage management system 100 and/or to define usage data and/or metadata items to be collected by monitoring subsystems 108.

Example Application Interaction Data and Metadata Evaluation

Figure 2:
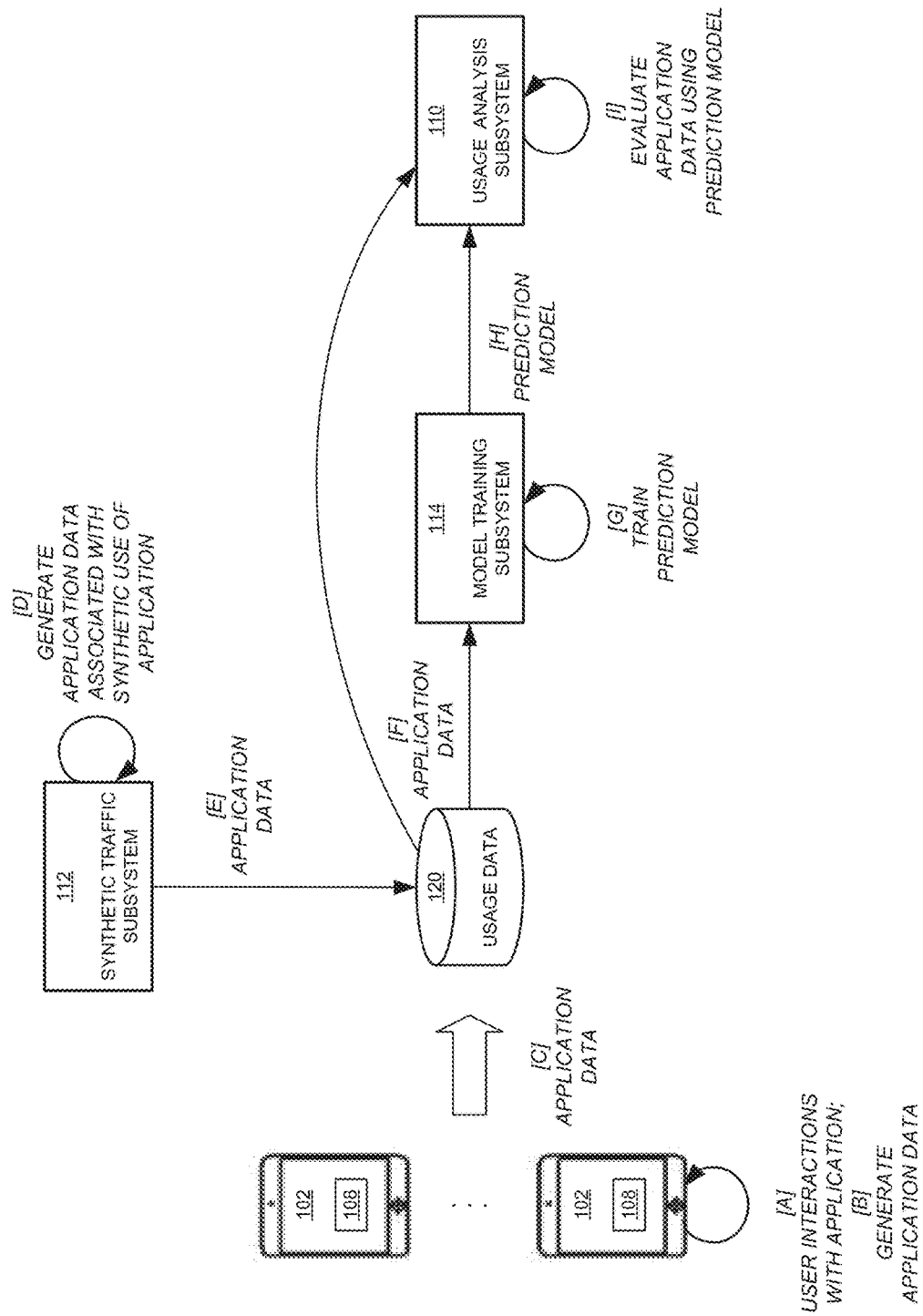
FIG. 2 is a block diagram depicting illustrative data flows and interactions between user systems and components of a usage management system according to some embodiments.

FIG. 2 shows illustrative data flows and interactions between user systems 102 and various subsystems of the usage management system 100.

Application server 104 may host or support a network-based application, such as a web site that is accessible via a web browser software executing on user systems 102, or server-side components that communicate with client-side application software executing on user systems 102. As a user interacts with the network-based application via a web browser or other application software executing on a user system 102 at [A], the monitoring subsystem 108 on the user system 102 generates application interaction data and associated application metadata at [B]. In some embodiments, application interaction data may represent various user interactions and other usage events, such as click locations, scroll events, navigation paths, data entry, crashes, etc. In some embodiments, application metadata may represent various related metrics and other data points, such as geographic location, browser version, latency/delays, communication headers, etc. Illustratively, the application data may be formatted and transmitted by the monitoring subsystem 108 according to a standard, such as JavaScript Object Notation ("JSON"), Extensible Markup Language ("XML"), YAML Ain't Markup Language ("YAML"), or the like.

In some embodiments, a user may click on displayed controls, enter data into fields, scroll to different locations, and otherwise interact with the network-based application. A period of consistent or substantially-consistent interaction and/or consumption (e.g., without a threshold period of inactivity) may be referred to as an application session. Over the course of an application session, a user may engage in any number of interactions and/or cause generation of data. Discrete sequences of interactions and consumption activities may be referred to as "user journeys." Some user journeys and other application sessions may result in performance of one or more operations, such as completion of a transaction, which may be a desired action. Other user journeys and application sessions may end after a threshold period of inactivity with no transaction or other desired action. The monitoring subsystem 108 may generate and/or collect data regarding interactions occurring during application sessions, and application metadata otherwise associated with the application sessions. The data may be provided to usage management system 100 at [C], where it may be stored in the usage data store 120.

In some embodiments, synthetic traffic may also be used to generate application interaction data and/or application metadata. Synthetic traffic subsystem 112 may simulate user interactions with the network-based application, and a monitoring subsystem 108 on the synthetic traffic subsystem 112 generates application interaction data and associated application metadata at [D]. Application data regarding synthetic user journeys and other application sessions may be stored in the usage data store 120 at [E].

At [F], some or all of the application interaction data and/or application metadata stored in the usage data store 120 may be accessed by the model training subsystem 114 for use in training a prediction model at [G].

To train the prediction model, the application interaction data and metadata may be labeled to indicate whether a desired action or undesired action resulted from the associated user journeys or other application sessions. In some embodiments, labeling may be automated based on one or more criteria. For example, certain interactions may be predetermined to be desirable actions, such as completion of certain transactions. The occurrence of such interactions during a user journey or other application session may result in the session being labeled as resulting in a desirable action. Other interactions may be predetermined to be undesirable actions, and the occurrence of such interactions in an application may result in the session being labeled as resulting in an undesirable action. As another example, the lack of a desirable action during an application session coupled with the lack of any interaction for a threshold period of time (e.g., 10 minutes, 15 minutes, 20 minutes, 30 minutes, etc.) may result in the session being labeled as resulting in an undesirable action.

With the labeled application data, the model training subsystem 114 may train a prediction model to predict whether a user journey or other application session is likely to result in a desired or undesired action based on application data regarding the application session. In some embodiments, the prediction model may be a machine learning classification model (e.g., an artificial neural network, a decision tree, a random forest, or a support vector machine) that is configured to take, as input, application data associated with an application session and generate, as output, data representing an action or inaction that is likely to occur. The model may be provided to or otherwise accessed by the usage analysis subsystem 110 at [H].

At [I], usage analysis subsystem 110 may use the prediction model to evaluate application data regarding application sessions and predict whether the sessions are likely to result in desired or undesired actions. In some embodiments, results of evaluation of application using the prediction model may be used to recommend or generate feature experiments to increase the probability of desired actions and/or decrease the probability of undesired actions.

Figure 3:
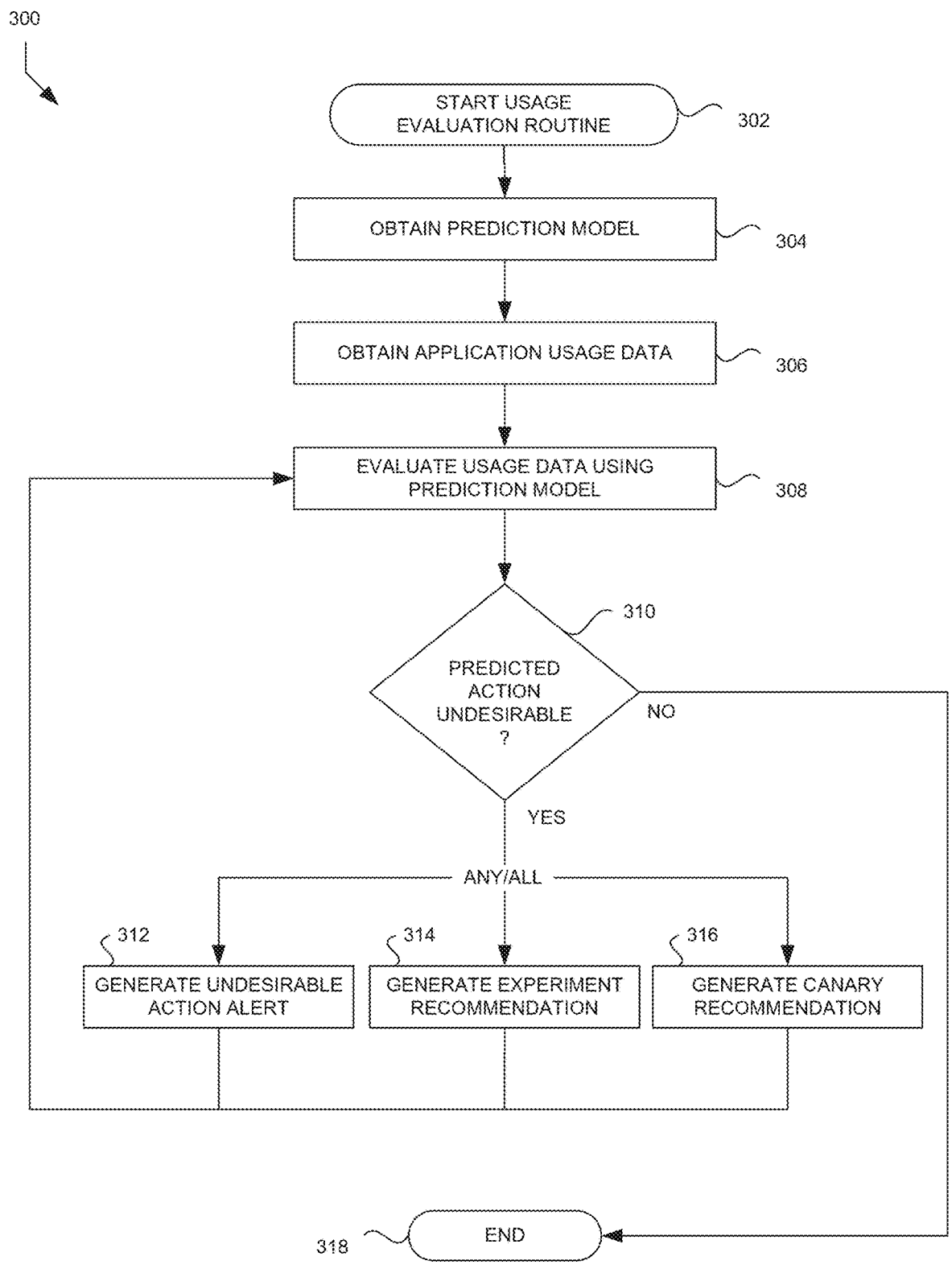
FIG. 3 is a flow diagram of an illustrative routine for evaluating application interaction data and application metadata using a prediction model and generating experiment recommendations according to some embodiments.

FIG. 3 illustrates an example routine 300 for evaluating application data regarding application sessions and determining feature experiments and/or canaries to be implemented. Advantageously, routine 300 makes use of a prediction model to identify which user journeys and other application sessions may or may not result in desired actions. Routine 300 will be described with further reference to the example application sessions illustrated in FIG. 4.

Routine 300 begins at block 302. In some embodiments, routine 300 may begin in response to an event, such as a request from an application management system 106. When the routine 300 begins, executable instructions may be loaded to or otherwise accessed in computer readable memory and executed by one or more computer processors, such as the memory and processors of computing system 1200 described in greater detail below.

At block 304, the usage analysis subsystem 110 may obtain a prediction model, such as from the model training subsystem 114.

At block 306, the usage analysis subsystem 110 may obtain application data for evaluation using the prediction model. The application data may include application interaction data and metadata that was not available or otherwise not used to train the prediction model. In some embodiments, the predication model may have been trained with application data regarding application interactions and associated metadata for application sessions occurring during a first period of time. The application data that is obtained at block 306 for evaluation using the model may be or include application data regarding application interactions and associated metadata for application sessions occurring during a second period of time that is wholly or partially subsequent to the first period of time. For example, the obtained application data may be associated with a current application session of a user for evaluation in real time or substantially real time. As another example, the obtained application data may be associated with multiple application sessions of users and/or canaries occurring after the first period of time. In some embodiments, canaries may be used to generate synthetic traffic and corresponding application data across all paths of the application on an ad hoc basis, in response to an event, or on a predetermined or dynamically determined schedule.

At block 308, the usage analysis subsystem 110 may evaluate the application data obtained at block 306 to generate one or more predicted actions. In some embodiments, the predicted actions may be classified as desired or undesired actions. For example, desired actions may include completion of a transaction (also referred to as a "conversion") or continued interaction with the application (also referred to as a "retention"), while undesired actions may be abandonment of an application session without completion of a transaction (also referred to as a "drop"). In some embodiments, the predicted actions may also or alternatively be identified with respect to particular portions of the network-based application. For example, usage analysis subsystem 110 may generate a prediction that a drop will occur on a particular page or screen, or in connection with a particular component. As another example, the usage analysis subsystem 110 may generate a prediction that a particular page or screen is likely to result in a retention or conversion.

Figure 4:
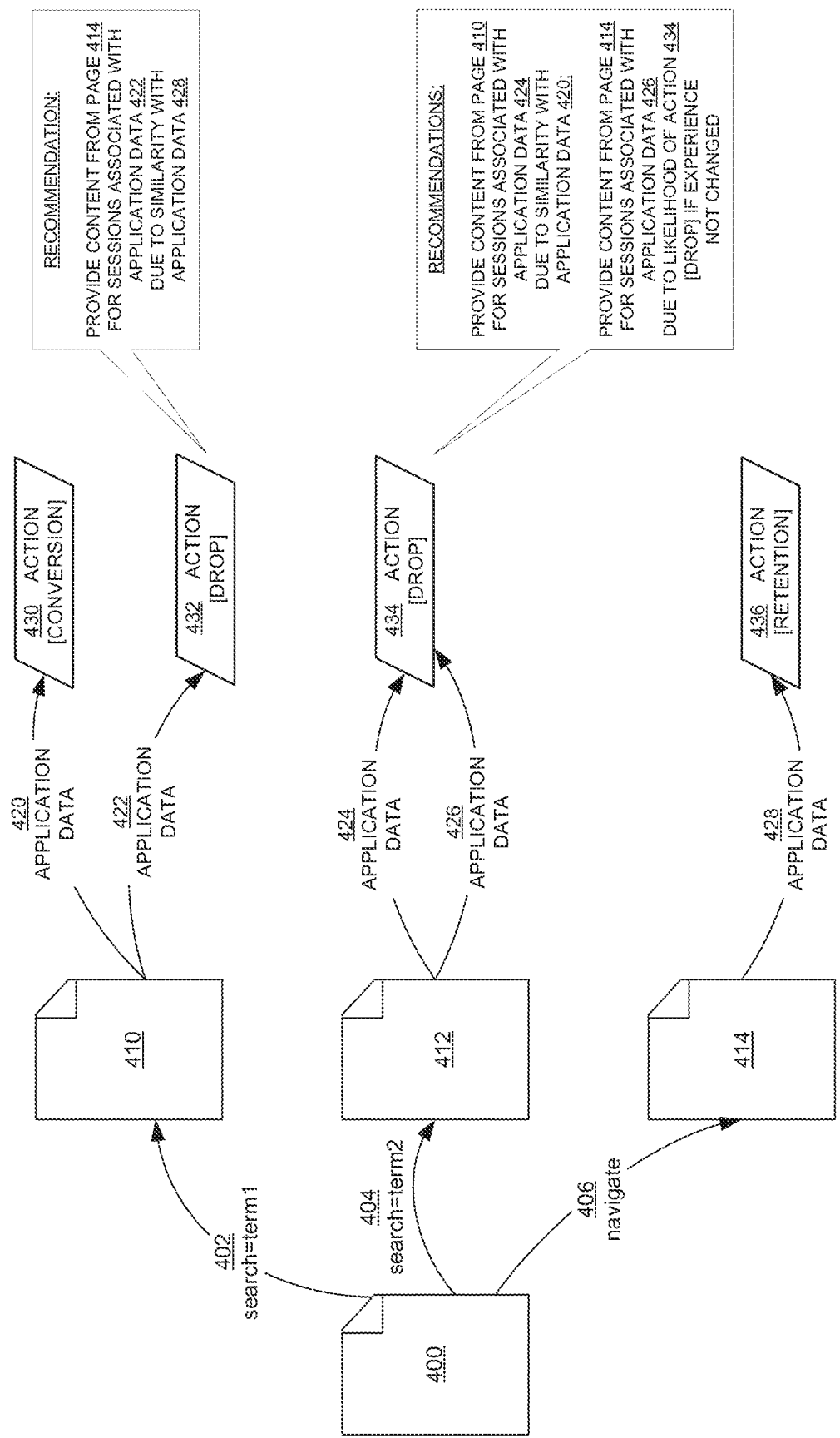
FIG. 4 is a diagram of illustrative user journeys including application interactions, application data, and associated actions according to some embodiments.

FIG. 4 is a diagram showing various steps in illustrative application sessions of a network-based application. The diagram illustrates the linkage of application data, including application interaction data and application metadata, to the application sessions and individual steps thereof. In addition, subsequent steps in the application sessions, including actions (desired and undesired) are shown being predicted based on the prediction model. In the description that follows, individual "steps" of a user journey or other application session refer to the to individual screens, presentations, or other results at which a user arrives based on one or more previous user (or synthetic) interactions, such a logging on to the application, activating a link, submitting a search, or the like.

Page 400 may be a landing page for the beginning of an application session. Illustratively, a user (or canary) may arrive page 400 based on first accessing the application, starting over during an existing application session, or after completing a particular application session. In the illustrated example, there are three most likely next steps in a user journey from page 400. Page 410 may be arrived at based on entry of a particular search query 402 ("term1") in a search control of page 400. Page 412 may be arrived at based on entry of a different search query 404 ("term2") in the search control of page 400. Page 414 may be arrived at based on navigation event 406, such as user selection of a link or activation of some other control of page 400. The steps following page 400 shown in FIG. 4 are illustrative only, and are not intended to be limiting, required or exhaustive. In some embodiments, there may be fewer, additional, and/or alternative steps. In addition, some steps may be related, such as pages 410 and 412 which may be presented from a common search results page of the application but the displayed results vary based on the particular search terms that are used.

The result of the user journey that includes transition from page 400 to page 410 may vary, depending on various conditions. For example, different network performance factors, user device performance factors, timing, user demographics, other conditions, or some combination thereof may be associated with different actions occurring after arriving at page 410: one set of conditions may be associated with a desired action (e.g., completion of a transaction), while another set of conditions may be associated with an undesired action (e.g., abandonment of the application session). The conditions associated with these differing results may be represented by application interaction data and application metadata (collectively, application data), at least part of which is collected by the monitoring subsystems 108 of user devices 102 accessing the application. A prediction model that has been trained using such application data, as described above, may be used to predict a likely action for a particular user journey based on the application data for the journey.

As shown in FIG. 4, for a user journey that includes a transition from page 400 to page 410 and is associated with a particular set of application data 420, the prediction model may generate a prediction that the user journey will result in a desired action 430 (e.g., a conversion). However, for the same or a similar user journey that includes transition from page 400 to page 410 but is associated with a different set of application data 422, the prediction model may generate a prediction that the user journey will result in an undesired action 432 (e.g., a drop).

For a user journey that includes a transition from page 400 to page 412 and is associated with a particular set of application data 424, the prediction model may generate a prediction that the user journey will result in an undesired action 434 (e.g., a drop). Moreover, for the same or a similar user journey that includes transition from page 400 to page 412 but is associated with a different set of application data 426, the prediction model may generate a prediction that the user journey will result in the same undesired action 434.

For a user journey that includes a transition from page 400 to page 414 and is associated with any set of application data 428, the prediction model may generate a prediction that the user journey will result in a desired action 436 (e.g., a retention).

Returning to routine 300 shown in FIG. 3, at decision block 310 the usage analysis subsystem 110 can determine, based on results of analyzing application data using the prediction model, whether a predicted action for a user journey or other application session is desirable or undesirable. If the prediction action is undesirable, routine 300 may proceed to block 312, block 314, and/or block 316. Otherwise, if the prediction action is desirable, routine 300 may terminate at block 318.

At block 312, the usage analysis subsystem 110 or some other subsystem of the usage management system may generate an undesirable action alert. The alert may include data indicating the undesirable action(s) predicted to occur so that a remedial action may be initiated. The alert may be an audio and/or visual alert that is displayed on a user interface, such as a user interface of an application management system 106. In some embodiments, the alert may include a recommendation of an experiment and/or a canary, generated as described below.

In some embodiments, an alert may be generated regarding an experiment that is currently in progress. The alert may serve as an indication that based on analysis of application data generated during the experiment, an undesirable action is more likely to occur than without the application variant being tested in the experiment, or that desirable actions are not more likely to occur with the application variant being tested in the experiment.

At block 314, the usage analysis subsystem 110 or some other subsystem of the usage management system 100 (such as the experiment management subsystem 118) may generate experiment data regarding a recommendation of an experiment associated with the undesirable predicted action determined in block 310. In some embodiments, the usage analysis subsystem 110 may identify a step in a user journey to be added to or substituted for an existing step within the user journey associated with the predicted undesired action. The step to be added or substituted may be selected from a similar user journey that is predicted to be likely to result in a desired action. For example, if there is a step from the similar user journey that is predicted to be likely to lead to a desired action (or is predicted to be less likely to lead to an undesired action), that step may be substituted for a step of the user journey for which an undesirable action is predicted to be likely. Discovery of user journey(s) that are candidates for experimentation may be based on application data obtained from other users and/or application data generated with synthetic traffic by a canary. The experiment data may include user-readable information regarding the experiment being recommended (e.g., the particular user journey steps, operations, features, etc. to be altered or implemented). In some embodiments, the experiment data may also or alternatively include configuration data and/or machine-readable instructions for implementing the experiment being recommended.

Returning to the illustrative user journeys shown in FIG. 4, the user journey that includes a transition from page 400 to page 410 may result in different actions 430 or 432 depending upon the conditions experienced during the user journey, as represented by the corresponding application data 420 or 422, respectively The usage analysis subsystem 110 may recommend an experiment in which, when conditions are similar to those represented by application data 422 (which is associated with a likely undesirable action 432), the application substitutes page 414 (or portions thereof) for page 410 (or portions thereof) in an attempt to increase the likelihood of a desirable action or reduce the likelihood of an undesirable action. This recommendation may be based on a similarity of application data 422 to application data 428 (e.g., based on an element-wise comparison, a similarity score, or some other evaluation of the similarity between two data vectors or data sets) for the journey that includes the transition from page 400 to page 414. The content from page 414 may be included on page 412 in an attempt to retain a user's interest in the current application session (action 436) when the session would otherwise be likely to be dropped (action 434).

The user journey that includes a transition from page 400 to page 412 is shown as resulting in an undesirable action 434 regardless of the application data 424 or 426 that is associated with the user journey. However, if application data 424 is the same as, or substantially similar to, application data 420 (e.g., based on an element-wise comparison, a similarity score, or some other evaluation of the similarity between two data vectors or data sets), then the usage analysis subsystem 110 may recommend an experiment in which users associated with application data 424 are redirected to page 410 instead of 412 in an attempt to increase the likelihood of a desirable action or reduce the likelihood of an undesirable action. In some embodiments, instead of changing the page to which a user is directed, the experiment may involve incorporation of elements from page 410 into page 412 (e.g., a top search result from page 410, an item that results in conversion action 430, etc.), or incorporation of a link to page 410 on page 412. The content from page 410 (e.g., a top-performing search result associated with conversion action 430) may be included on page 412 in an attempt to realize a conversion on page 412 when the session would otherwise be likely to be dropped (action 434).

FIG. 4 illustrates a third example recommendation generated based on a prediction of undesirable action 434 in a user journey that arrives at page 412 and is associated with application data 426. In this scenario, because the application session is likely to be dropped (action 434), the recommended experiment may be to provide content from page 414 on page 412 even though application data 426 may not be similar to application data 428. The content from page 414 may be included on page 412 in an attempt to retain a user's interest in the current application session (action 436) when the session would otherwise be likely to be dropped (action 434).

Returning to FIG. 3, at block 316, the usage analysis subsystem 110 or some other subsystem of the usage management system 100 may generate canary data regarding a recommendation of a canary associated with the undesirable predicted action determined in block 310. In some embodiments, a canary may be recommended to continue monitoring the same or similar user journeys that result in the predicted undesirable action so that the usage analysis subsystem 110 can determine whether the undesirable action becomes more or less likely to occur over time, and/or to identify particular sets of application data that may be more or less likely to result in the undesirable action. In some embodiments, a canary may be recommended to monitor other portions of the application to potentially identify alterative user journeys (or portions thereof) that may be recommended for experimentation. The canary data may include user-readable information regarding the canary being recommended (e.g., the particular user journey steps, operations, features, etc. for which synthetic traffic is to be generated). In some embodiments, the canary data may also or alternatively include configuration data and/or machine-readable instructions for implementing the canary being recommended.

Routine 300 may return to block 308 for evaluation of application data associated with the recommended experiment or canary (if any). In some embodiments, the usage analysis subsystem 110 may determine the results of an experiment and whether the experiment should be ended, modified, or continued. In some embodiments, routine 300 may return to decision block 310 for determination of additional experiments.

Although routine 300 is described as generating an experiment to be performed under certain conditions, the performance and effect of routine 300 is not limited to only experimental recommendation. In some embodiments, routine 300 or a variant thereof may be used to evaluate an application session in real-time or substantially real-time, and the user journey maybe dynamically managed based on evaluation of application data using the prediction model. For example, two users accessing the application at substantially the same time, and performing substantially the same interactions, may be presented with different user journey experiences depending upon the other application data with which their application sessions are associated and the output of the prediction model. As another example, a single user accessing the application at two different times and performing substantially the same interactions may be presented with different user journey experiences each time depending upon the other application data with which their applications sessions are associated and/or a change in training of the prediction model.

In some embodiments, the prediction model may be used to predict the performance of application features. For example, an application developer or administrator may use an application management system 106 to configure or modify aspects of an application, such as the particular interactive controls on a page, the sequence of pages to be accessed in response to events, etc. To aid the developer, predictions may be generated regarding the most likely outcome action for use of the interface, or aspects thereof, based on particular types of application data.

Figure 5:
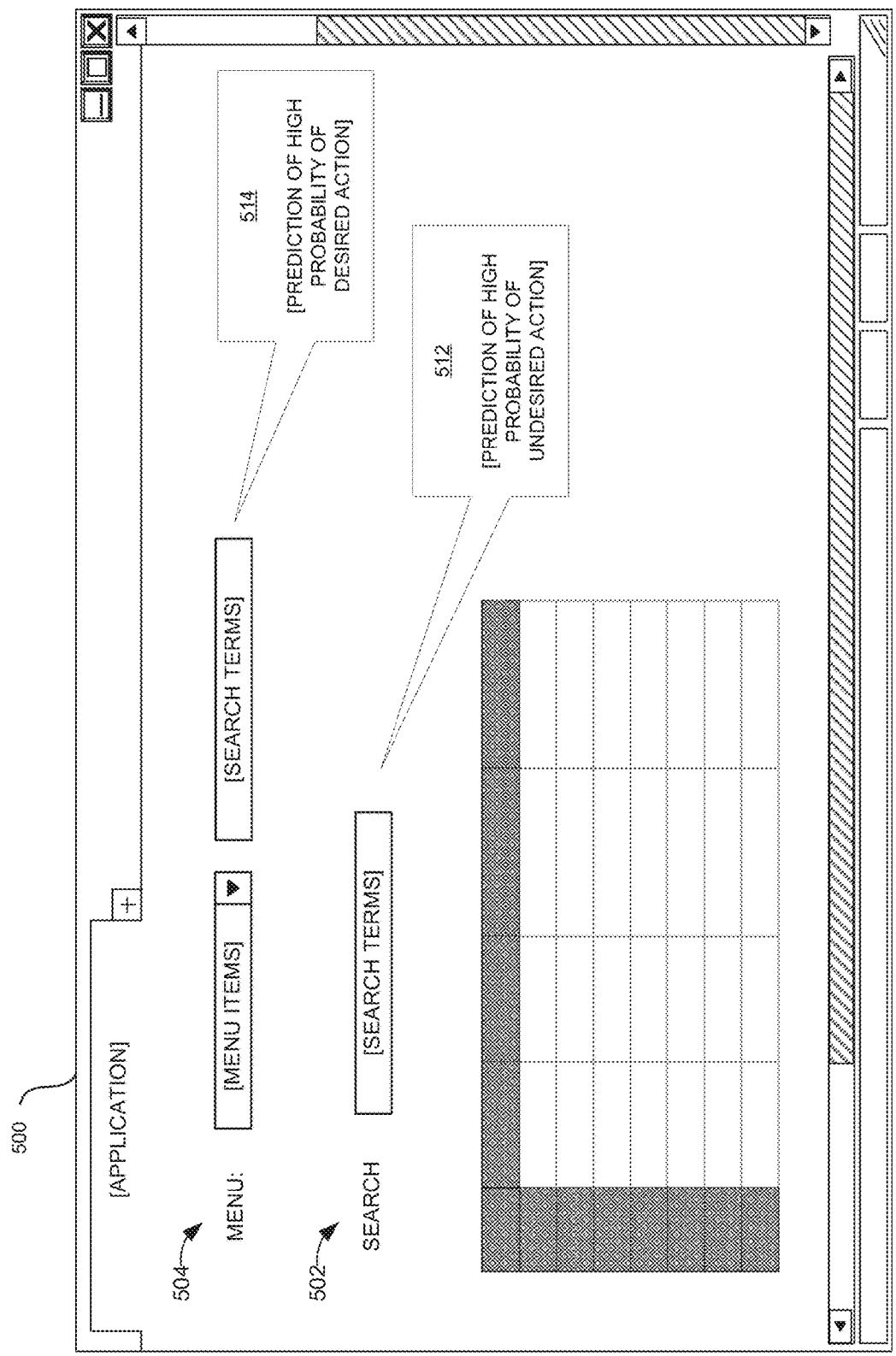
FIG. 5 is a user interface diagram depicting illustrative controls and corresponding predictions according to some embodiments.

FIG. 5 illustrates an example user interface 500. The user interface 500 includes various interactive controls with which a user may interact to proceed to a next step of a user journey or other application session. In the illustrated example, the user interface 500 includes a search control 502 and a menu control 504, among others. Illustratively, the search control 502 allows a user to enter search terms and retrieve search results associated with the entered search terms. The menu control 504 allows a user to navigate the application by seeing which steps may be taken next and selecting a step of interest. In some cases, the end goals of the two controls may be the same or similar: arriving at a portion of the application that is of interest from which a particular type of action (e.g., completion of a transaction) action can be taken.

To aid the developer in determining which interactive control to use, prediction data may be provided regarding the actions that are predicted to be most likely to result from use of the controls under certain circumstances represented by application data. For example, search control 502 is tagged with first prediction data 512 representing a high probability of an undesired action in circumstances represented by certain application data. In contrast, menu control 504 is tagged with second prediction data 514 representing a high probability of a desired action in circumstances represented by the same or similar application data. In this way, a developer can make various application design and tuning decisions, such as determining which control to use or maintain on a page, determining the circumstances under which a control should be used, and the like. In some embodiments, the interface 500 may be presented as a what-you-see-is-what-you-get ("WYSIWYG") designer in which recommendations can be provided regarding which control to use based on the prediction data associated with the controls.

Dynamic Traffic Segmentation

Feature experimentation, feature rollouts, and the like may rely on segmentation of user traffic. For example, users may be assigned to different experiment segments or "cohorts," and different cohorts may be treated differently (e.g., provided with different user experiences). The data upon which traffic is segmented, cohorts are defined, and users are assigned to cohorts may be determined in advance of an experiment or feature rollout.

To further aid in discovering meaningful cohorts, the usage management system 100 can permit dynamic changes to the data upon which traffic is segmented. In some embodiments, an application administrator or developer may use an application management system 106 to define, during a feature experiment or feature rollout, changes to the data to be collected by the monitoring subsystems 108 of user devices 102 and used to generate and/or assign cohorts or otherwise segment traffic. For example, application interaction data and application metadata may be defined in terms of keys and values. Each item of such application data may have a key (e.g., user ID, browser version, time of day, cursor location, etc.), and a corresponding value or set of values. Prior to and/or during an experiment, the application administrator or developer may specify additional and/or alternative application data keys for the application data. The specification of such additional and/or alternative application data keys may be transmitted to—or cause modification of—the monitoring subsystems 108. Subsequently, the monitoring subsystems 108 may provide data associated with the additional and/or alternative application data keys. In response to the change in application data keys being used, the dynamic segmentation subsystem 116 may then begin using the data to generate new sets of cohorts, modify existing sets of cohorts, and the like.

Figure 6:
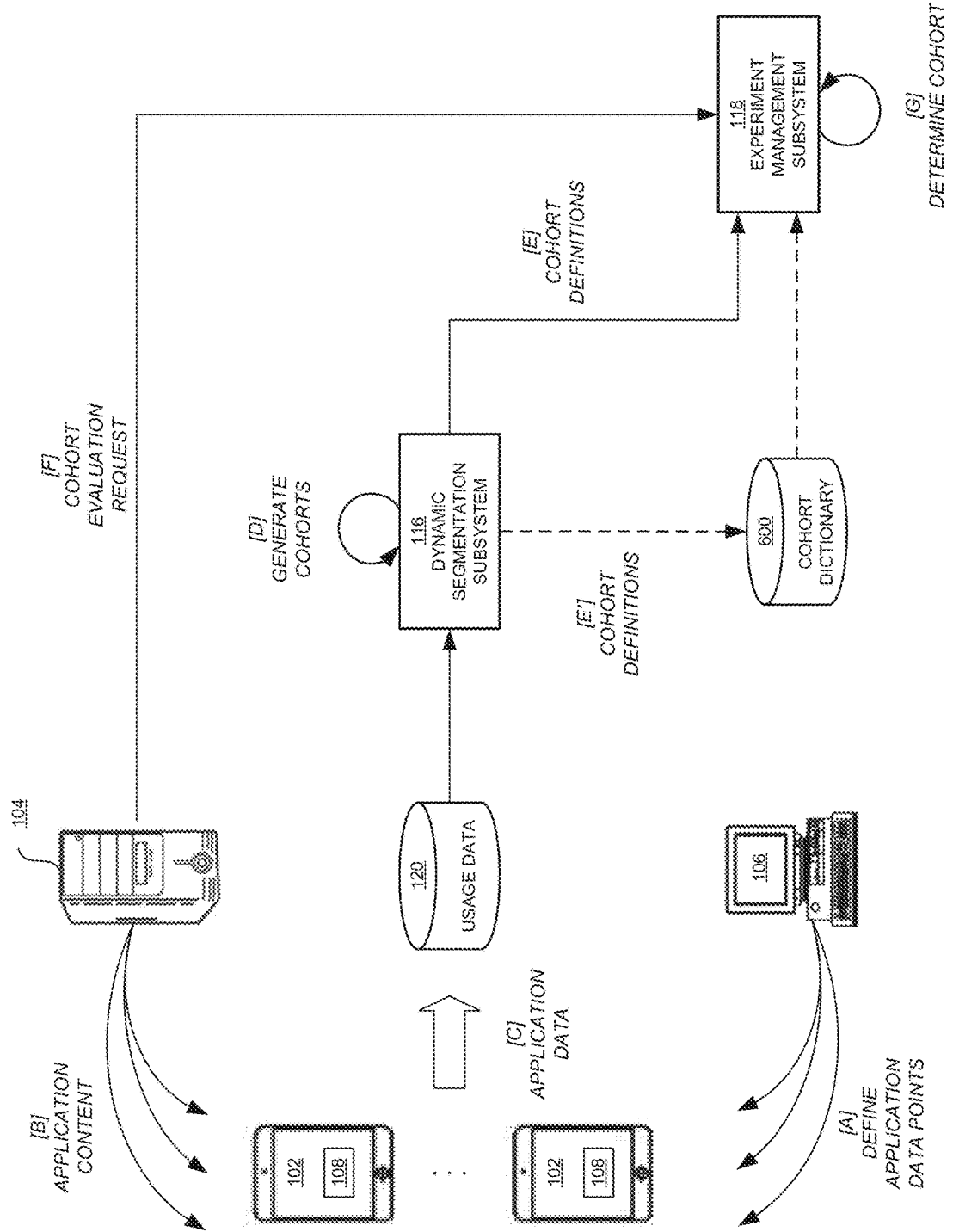
FIG. 6 is a block diagram depicting illustrative data flows and interactions between user systems and components of a usage management system for dynamic segmentation according to some embodiments.

FIG. 6 illustrates example data flows and interactions between user devices 102, an application server 104, an application management system 106, and various subsystems of a usage management system 100 during dynamic segmentation based on changes to data used to perform the segmentation.

User devices 102 access content and/or other application data from the application server 104 during an experiment or feature rollout. The particular content and/or other application data that individual user devices 102 receive may depend upon the segmentation of the users: a user of one user device 102 may be assigned to one cohort, while a user of another user device 102 may be assigned to a different cohort. Accordingly, interactions performed by the users, even if similar or the same, may result in access to different application experiment experiences, such as different application content or flows of execution. An application experiment experience may also be referred to as a "user experience." Additionally, due to the different cohorts to which the users are assigned, they may be expected to perform different interactions and/or be associated with different application data.

At [A], an application management system 106 may define additional and/or alternative application data to be collected and reported by the monitoring subsystems 108. The changes to the application data to be collected may be communicated directly by the application management system 106 to the user systems 102 and monitoring subsystems 108 executing thereon. In some embodiments, the changes to the application data to be collected may be communicated first to an intermediary system, such as the application server 104 or the usage management system 100.

With reference to an illustrative example, the monitoring subsystems 108 may initially be configured to collect, among other data items, data regarding a time of day at which a transaction occurs. To further refine the predictions made for individual application sessions and traffic segmentation, an application administrator may add to the application data items to be collected by the monitoring subsystem 108. In this example, the application administrator may determine that search terms used by the user are to be collected.

After the monitoring subsystems 108 have been configured to collect additional application data (e.g., regarding search terms), the user devices 102 may access content and/or other application data from the application server 104 at [B] and interact with the network-based application. At [C], the monitoring subsystems 108 may collect application data, including the additional application data item specified by the application management system 106.

At [D], the dynamic segmentation subsystem 116 may segment the traffic received from the user devices 102. The end result of this segmentation may be definition of a set of cohorts of end users. These cohorts may be used for experimentation of features, rollout of features, etc.

In some embodiments, the process of segmentation and definition of cohorts may be performed during an experiment based on application data generated during the experiment. Thus, the cohorts that are used during the experiment to determine which features to provide, modify, or omit for individual end users may change over the course of the experiment. The change to the cohorts may result in a different set of cohorts (e.g., additional or fewer cohorts) and/or different definitions of which end users are assigned to the cohorts. For example, a user that is part of one cohort at one point during an experiment may later be part of another cohort due to changes in application data associated with the user's application sessions and/or due to changes in the definitions of the cohorts.

Segmentation of the traffic may be performed based on a clustering algorithm, such as k-means, affinity propagation, mean-shift, spectral clustering, agglomerative clustering, density-based special clustering of applications ("DB-SCAN") or some other clustering algorithm. For example, application data associated with various end users may be evaluated using a clustering algorithm to segment the user-specific sets of application data into different clusters. The definitions of the different clusters (which may vary somewhat or significantly in form and and/or segmentation results depending upon the algorithms used) may serve as the definitions of the different cohorts.

In some embodiments, segmentation of the traffic may be based on objectives, such as desired/undesired actions defined by an application administrator via an application management system 106. For example, data regarding an objective (e.g., whether the objective is satisfied or not) may be included as a data point in a clustering process such as those described above. As another example, end users may be segmented based on whether an objective was satisfied during their respective application sessions, which objective(s) was/were satisfied or not satisfied, a quantity and/or frequency with which objectives were or were not satisfied, or the like. These objective-based segments may serve as cohorts and the cohort definitions may be set accordingly. In some embodiments, the objective-based segments may be further segmented using secondary objectives and/or clustering processes such as those described above to arrive at a set of cohorts.

The example methods of cohort definition described herein are illustrative only, and are not intended to be limiting, required or exhaustive. In some embodiments, additional and/or alternative methods of cohort definition may be used to dynamically determine, define, and assign end users to cohorts during an experiment, feature roll out, or the like. In some embodiments, cohort definitions may not necessarily be explicitly generated, but may instead be maintained by training of a machine learning classification model (e.g., an artificial neural network, a decision tree, a random forest, or a support vector machine) that is configured to take, as input, application data associated with an end user and generate, as output, data representing one or more cohorts to which the end user belongs.

Cohort definitions (whether in explicit form or in classification model form) may be provided to—or otherwise made available to—the experiment management subsystem 118 at [E] for use in determining how to manage end users' application sessions. In some embodiments, cohort definitions may be added to a cohort dictionary 600 at [E'] instead of, or in addition to, being provided to the experiment management subsystem 118. For example, the experiment management subsystem 118 may access the cohort definitions from the cohort dictionary 600 during an experiment. As another example, cohort definitions from the cohort dictionary 600 may be accessed and re-used in other experiments.

At [F], subsequent to dynamic determination of end-user cohorts during an ongoing experiment, the application server 104 may request, from the experiment management subsystem 118, an evaluation of which cohort(s) a particular end user is assigned to so that the application server 104 may determine the application experiment experience (e.g., application content or flow of execution) to be provided to the end user. For example, a user system 102 may access the network-based application by sending a request to the application server 104 for application content. The request may be received at the beginning of a new application session, or during an existing application session. The application server 104 may request evaluation of the end user by the experiment management subsystem 118.

At [G] the experiment management subsystem 118 may determine the cohort(s) to which the current end user is assigned based on the dynamic cohort definitions that have been generated during the experiment. The experiment management subsystem 118 may then respond to the application server 104 with data representing the cohort(s), such as cohort identification numbers.

Although the application server 104, experiment management subsystem 118, and various other systems and subsystems are shown in some figures and treated in some descriptions herein as being physically or logically separate from each other, the examples are illustrative only and are not intended to be limiting, required, or exhaustive. In some embodiments, the application server 104 may be part of the usage management system 100 or vice versa such that the functionality provided by the application server 104 and the functionality provided by one or more components of the usage management system 100 are implemented using the same physical or virtual computing system. In some embodiments, the application server 104 may include an experiment management subsystem 118 or vice versa such that the functionality provided by the application server 104 and the functionality provided by the experiment management subsystem 118 are implemented using the same physical or virtual computing system. This shared functionality is reflected in the examples shown in FIGS. 7 and 8, in which certain operations are not specifically separated among the application server 104 and various components of the usage management system 100.

Figure 7:
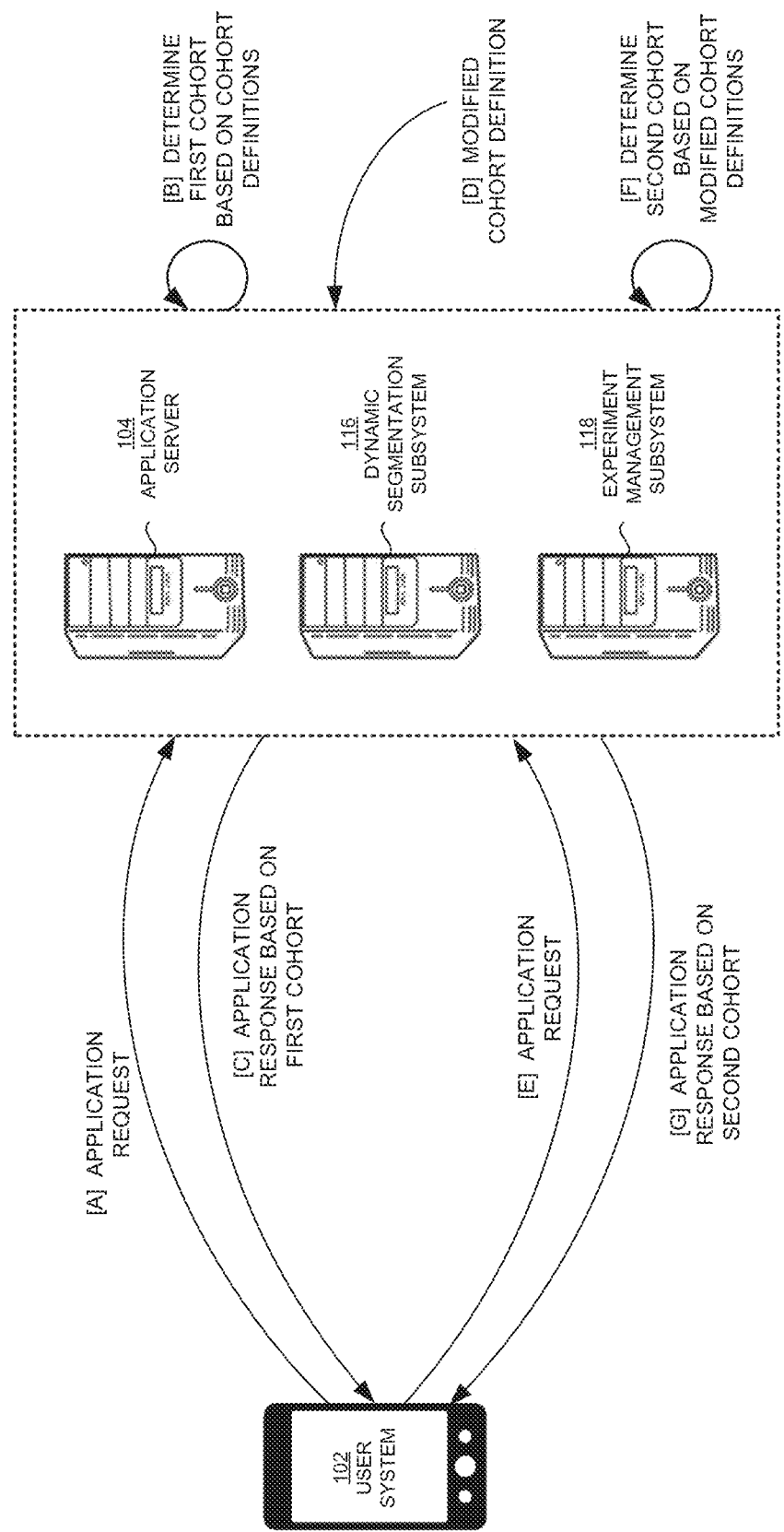
FIG. 7 is a block diagram depicting illustrative data flows and interactions between a user system and components of a usage management system during dynamic segmentation according to some embodiments.

FIG. 7 shows example interactions and data flows between a user system 102, an application server 104, a dynamic segmentation subsystem 116, and an experiment management subsystem 118 to illustrate dynamic segmentation during an experiment. In the illustrated example, the cohort definitions used to determine the cohorts to which users belong are changed between two requests in an experiment and result in an end-user being evaluated as part of different cohorts and thereby receiving different application experiences during the same experiment.

At [A], a user system 102 sends an application request or command, such as a request to access application content. Based on application data associated with the user system 102, the experiment management subsystem 118 determines at [B] that the user system 102 (or an end-user thereof) is properly assigned to a first cohort of a current set of possible cohorts for an experiment. Based on this evaluation, the application server 104 at [C] provides a response that is associated with a user experience selected for end users of the first cohort. Illustratively, the response may or may not have been different in one or more respects if the evaluation had placed the end user in a different cohort. For example, the user may be associated with a particular time of use and prior interactions. The experience selected for users of this cohort may be different than the experience selected for users associated with a different time of use and/or prior interactions.

Subsequent to the application server 104 providing the response, the definitions for cohorts may be changed at [D]. In some embodiments, the definitions may be changed based on an updated clustering or other segmentation process that is performed with application data collected during the experiment. In some embodiments, the types of application data that is collected during the experiment may be changed, and the clustering or other segmentation process may be performed to determine an updated set of cohort definitions considering the types of application data currently being collected. For example, an application administrator may determine, based on an analysis of experimental data and/or an experiment recommendation generated as described in greater detail above, that an additional item of application data is to be collected. The experiment may further be modified to customize the experience for users based on the additional item of application data. Illustratively, it may be determined that application sessions beginning around a particular time and which include a search for a particular search term tend to result in a particular transaction (e.g., acquisition of a content item). The experiment may be modified to emphasize, for users in a cohort associated with that time and who have submitted that particular search term, an option to complete the transaction.

After the passage of some period of time (e.g., seconds, minutes, hours, days, etc.) from receipt of the response at [C] and the change to the cohort definitions at [D], the same user system 102 and same end user thereof may send an application request or command to the application server 104 at [E]. Based on application data associated with the user system 102 and the modified cohort definitions, the experiment management subsystem 118 determines at [F] that the user system 102 (or an end-user thereof) is properly assigned to a different cohort of a modified set of possible cohorts for an experiment: a second cohort. Based on this evaluation, the application server 104 at [G] provides a response that is associated with a user experience selected for end users of the second cohort.

Figure 8:
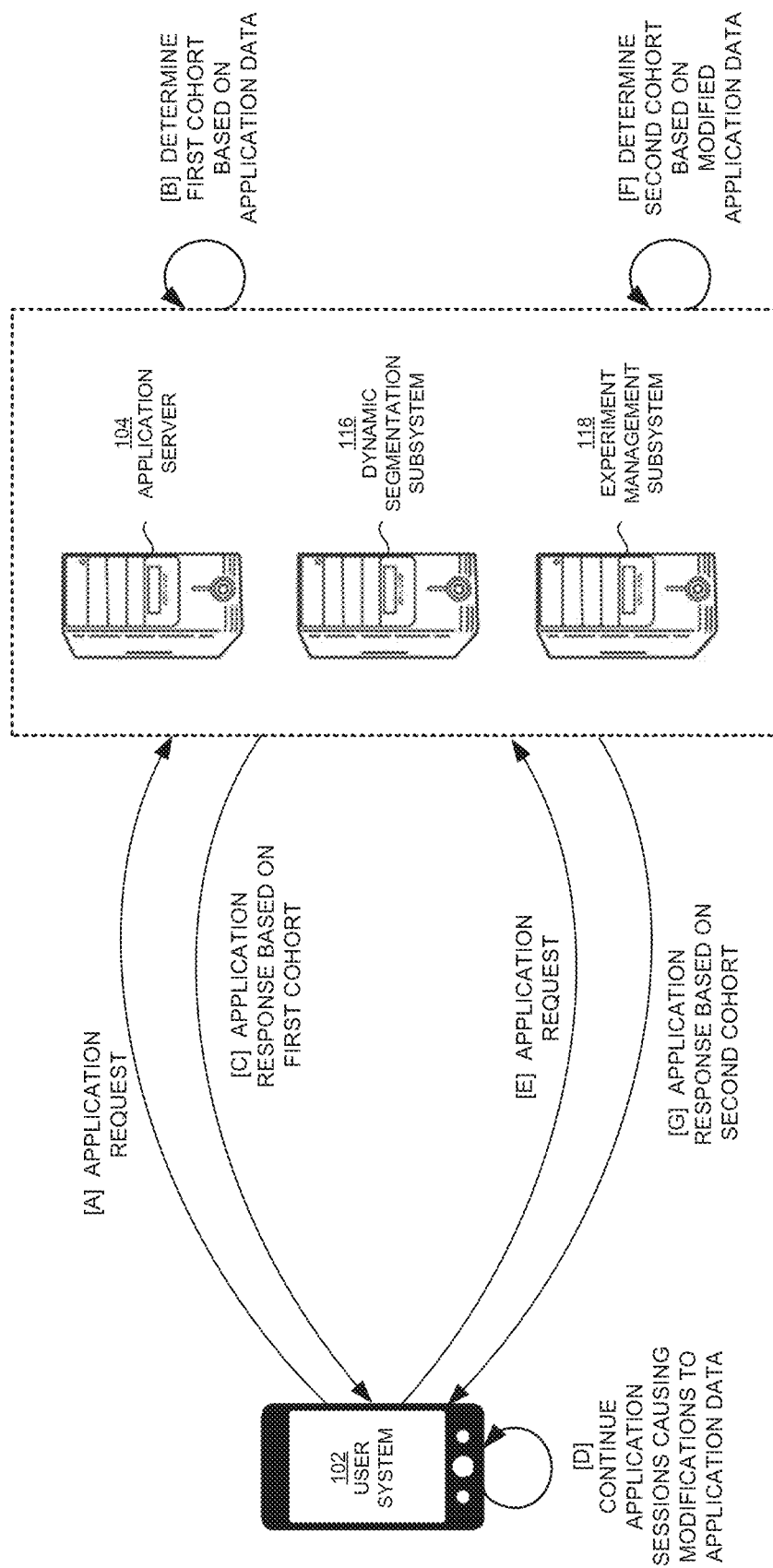
FIG. 8 is a block diagram depicting illustrative data flows and interactions between a user system and components of a usage management system during dynamic segmentation according to some embodiments.

FIG. 8 shows example interactions and data flows between a user system 102, an application server 104, and an experiment management subsystem 118 to illustrate dynamic segmentation during an experiment. In the illustrated example, the cohort definitions used to determine the cohorts to which users belong have not changed between two requests in an experiment. However, the application data with which a particular end user is associated has changed, and results in the end-user being evaluated as part of different cohorts and thereby receiving different experiences during the same experiment.

At [A], a user system 102 sends an application request or command, such as a request to access application content. Based on application data associated with the user system 102, the experiment management subsystem 118 determines at [B] that the user system 102 (or an end-user thereof) is properly assigned to a first cohort of a current set of possible cohorts for an experiment. Based on this evaluation, the application server 104 at [C] provides a response that is associated with a user experience selected for end users of the first cohort.

Subsequent to the application server 104 providing the response, the end user may perform various interactions during one or more application sessions at [D]. As a result, the end user may now be associated with a different set of application data than when the user made the request at [A]. The same user system 102 and same end user thereof may then request application content or other application data from the application server 104 at [E]. Based on changed application data associated with the user system 102 and the same set of cohort definitions, the experiment management subsystem 118 determines at [F] that the user system 102 (or an end-user thereof) is properly assigned to a different cohort of the set of possible cohorts for an experiment: a second cohort. Based on this evaluation, the application server 104 at [G] provides a response that is associated with a user experience selected for end users of the second cohort.

Although FIGS. 7 and 8 each show only a single user system 102 performing all user interactions, the examples are for ease of illustration only, and are not intended to be limiting or required. In some embodiments, a single user may use multiple devices, such as by performing one application session on a first device, a second application session on a second device, a third application session on a third device or returning to the first device, and so on. In such cases, the application data items generated during the various application sessions may be associated with the user based on a user account, a user number, or some other identifying information. Accordingly, a user system 102 may be considered to be any device or combination devices that a user uses to interact with the application.

Streaming Evaluation

Evaluation of the results of a feature experiment or rollout may rely on statistical analysis of metrics generated during the experiment or rollout. Rather than wait until metrics are available for the entire experiment, the usage management system 100 may generate real-time or substantially real-time results in a streaming manner.

Figure 9:
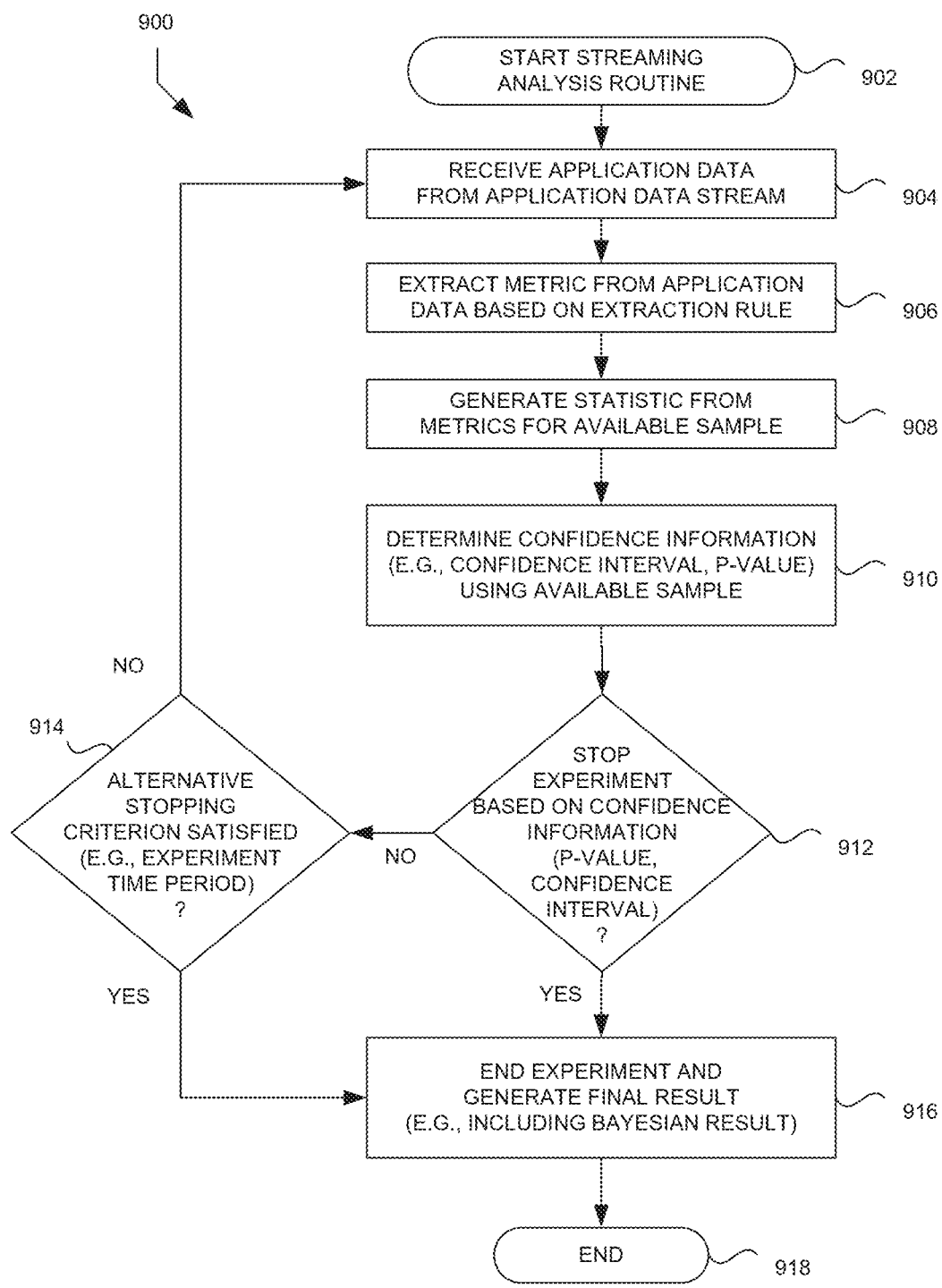
FIG. 9 is a flow diagram of an illustrative routine for streaming analysis of application data generated during an experiment according to some embodiments.

FIG. 9 is a flow diagram of an illustrative routine 900 that a usage analysis subsystem 110 or some other subsystem of a usage management system 100 may execute to perform streaming analysis of application data associated with a feature experiment, also referred to herein as "feature experiment data." The routine 900 will be described with further reference to the example usage analysis subsystem 110 shown in FIG. 10, and the example streaming results shown in FIG. 11.

Figure 10:
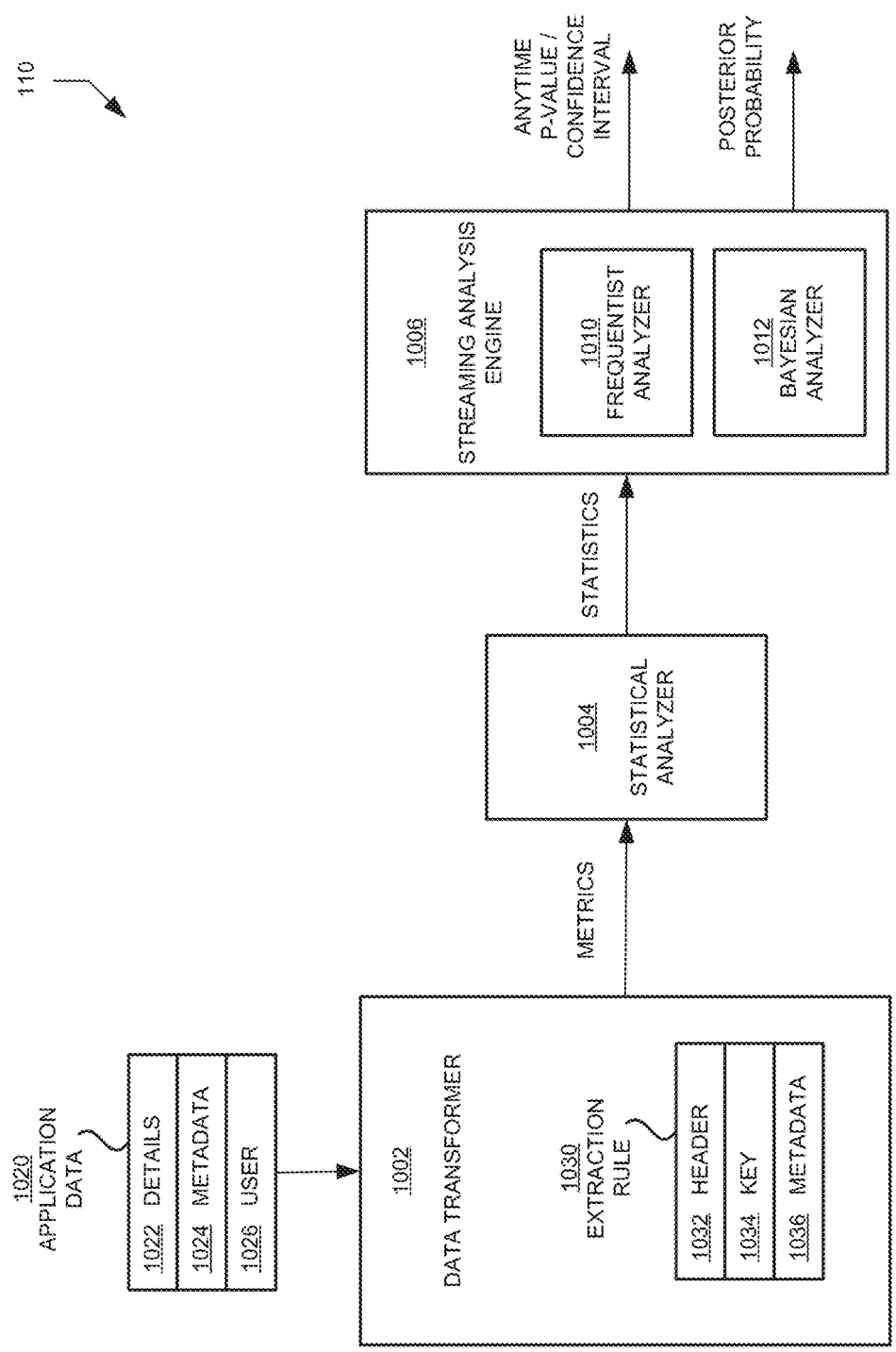
FIG. 10 is a block diagram depicting illustrative data flows and interactions between components of a usage analysis system during streaming analysis of application data according to some embodiments.

FIG. 10 illustrates data flows that may occur during streaming evaluation of feature experiment data by a usage analysis subsystem 110 during routine 900. The usage analysis subsystem 110 shown includes various components to facilitate streaming evaluation of feature experiment data, including a data transformer 1002, a statistical analyzer 1004, and a streaming analysis engine 1006. The streaming analysis engine 1006 may have various components for analyzing the data as processed by the other components, such as a frequentist analyzer 1010 and a Bayesian analyzer 1012.

Returning to FIG. 9, routine 900 starts at block 902. In some embodiments, routine 900 may begin in response to an event, such as when a feature experiment is started as described in greater detail above. When routine 900 begins, executable instructions may be loaded to or otherwise accessed in computer readable memory and executed by one or more computer processors, such as the memory and processors of computing system 1200 described in greater detail below.

At block 904, the usage analysis subsystem 110 may receive application data regarding usage, by a particular user system 102, of a network-based application during an experiment. The application data may represent the state of an application session at a particular point in time, at occurrence of a particular event, or the like. The application data may be associated with a particular feature variant that is part the experiment. For example, if the experiment is to test a feature difference in a treatment set compared to a control or default set, the application data may be associated with an application session in one of these sets.

FIG. 10 illustrates receipt of application data 1020. The application data 1020 may be formatted and transmitted according to a standard, such as JSON, XML, YAML, or the like. The application data 1020 may include various sections, such as a details section 1022 that includes data regarding certain metrics of interest, a metadata section 1024 that includes data regarding the context of the application data 1020 and that may be inspected to determine whether to accept the application data, a user details section 1026 that includes data regarding the particular user and/or application session to which the application data 1020 applies, other sections, or some combination thereof.

At block 906, the data transformer 1002 or some other module or component of the usage analysis subsystem 110 may extract one or more metrics from the application data. The usage analysis subsystem 110 may use a rule or a set of rules to extract metrics from events and other application data. Such rules may be referred to as metric extraction rules, or simply as extraction rules. For example, the extraction rules may specify a key or other identifier of a metric within the application data, one or more criteria for acceptance of the application data and/or metric extracted therefrom, and/or various other metadata to be extracted or considered. The metrics to be extracted may be specified by an application administrator (e.g., via an application management system 106), specified as part of an experiment recommendation, specified as a default metric for all experiments, or specified from some other source. In some embodiments, the metrics to be extracted may change during the course of an experiment, as described in greater detail above.

FIG. 10 illustrates an example extraction rule 1030 that the data transformer 1002 may use to extract a metric from application data 1020. The metric extraction rule 1030 may be formatted and transmitted according to a standard, such as JSON, XML, YAML, or the like. The example metric extraction rule 1030 includes a header section 1032 that specifies the particular header values, such as experiment identifiers, that will be used to identify the application data 1020 to be analyzed for the current experiment. The metric extraction rule 1030 further includes a key section 1034 that specifies the key, within the details section 1022 of application data 1020, for which a corresponding value is to be extracted. The metric extraction rule 1030 further includes a metadata section 1036 that specifies various conditions to be met by data from the metadata section 1024 of application data 1020 in order to accept the application data 1020 into the streaming analysis for the experiment.

Table 1 below provides an example of a metric extraction rule that may be used to extract a metric from feature experiment data generated during a feature experiment:

TABLE 1

Example Metric Extraction Rule

```
{
    "entityIdKey": "$.userDetails.userId",
    "valueKey": "$.details.pageLoadTime",
    "eventPattern": {
        "userDetails": { "userId": [ { "exists": true } ] },
        "metadata": {
            "pageUrl": [ "https://.abc.123" ],
            "browser": [ "Firefox", "Chrome" ]
        }
    }
}
```

Table 2 below provides an example of feature experiment data that may be received and processed according to the example metric extraction rule shown above:

TABLE 2

Example Feature Experiment Data

```
{
    "details": {
        "pageLoadTime": 900,
        "domProcessingTime": 300
    }
    "metadata": {
        "pageUrl": "https://www.amazon.com",
        "browser": "Chrome"
    },
    "userDetails": {
        "userId": "TestUser",
        "sessionId": "Test Sesson"
    }
}
```

Illustratively, based on the example metric extraction rule shown in Table 1, the data transformer 1002 may extract the value "900" for the metric represented by the "pageLoadTime" key in the example feature experiment data shown in Table 2.

The example fields, values, and sections shown in application data 1020 and metric extraction rule 1030 are illustrative only, and are not intended to be limiting, required, or exhaustive. In some embodiments, application data 1020 and/or metric extraction rule 1030 may include additional, fewer, and/or alternative fields, values, and/or sections.

At block 908, statistical analyzer 1004 or some other module or component of the usage analysis subsystem 110 may generate one or more statistics from the extracted metric(s). A statistic may be generated using the metric value extracted at block 906 above, and metric values extracted from any number of previously-received items of application data 1020. In this way, the usage analysis subsystem 110 may generate statistics in a streaming fashion, similar to the stream of application data 1020 items. In some embodiments, the generated statistic may be a mean, median, mode, minimum, maximum, variance, quantile, or some other statistical measure of an available sample. The available sample may be the set of all metrics obtained in the experiment up to and including the current metric, or some subset thereof such a sliding window of time or quantity of metrics up to and including the time of the current metric.

At block 910, the streaming analysis engine 1006 or a component thereof, such as the frequentist analyzer 1010, may determine confidence information (e.g., a confidence interval, a p-value, or some other significance level) for the one or more statistics generated from the available sample. For example, the streaming analysis engine 1006 may compute a difference in corresponding statistics for the different variants (treatment and control). A difference in corresponding statistics, such as a difference in the means of same metric computed for each variant, may represent a difference in the underlying variants. The significance level may be a p-value that indicates how likely it is to observe a difference that is at least as large as the difference observed in the available sample by random chance, assuming that there is no difference between the two variants being tested in the experiment. The lower the p-value, the less likely that the observed effect was found by chance.

In some embodiments, a statistical difference is considered significant if the p-value is lower than a threshold. For example, the threshold may be 0.05, which corresponds to a 95% probability that the true value for the statistical difference over the entire experiment is at least a significant as the measured statistical difference in the available sample. A p-value computed from the streaming input for the available sample may be referred to as an "anytime value significance level."

In one specific non-limiting example, this is done by applying hypothesis tests, where the so-called "null hypothesis" is that there is no difference between treatment and control variants. A statistical test is used to compute p-values, which denote the probability for a false-positive significance result (e.g., where a false positive is considering an observed difference over the available sample to be significant even if there is no actual difference over the entire experiment). The null hypothesis is either rejected (e.g., the difference between treatment and control is significant) or not rejected (e.g., any observed difference is not significant) based on whether the p-value lies below a certain threshold.

The streaming analysis engine 1006 or a component thereof, such as the frequentist analyzer 1010, may also or alternatively determine a confidence interval for the statistical difference. The streaming analysis engine 1006 may generate confidence interval of the statistical difference computed for the metric in the treatment set and the metric in the control set. The confidence interval may be generated to a threshold degree of confidence. For example, a 95% confidence interval captures the true difference between the computed statistics (e.g., means) of the variations (e.g., treatment and control) 95% of the time. The statistical difference between the computed statistics for the variations is negative if the statistic computed for the metric in the tested variation is smaller than the statistic computed for the metric in the control variation, and positive if the statistic computed for the metric in the tested variation is larger than the statistic computed for the metric in the control variation Illustratively, the confidence intervals may be quite wide at the beginning of the experiment, and may narrow down over the course of the experiment as more data is collected and analyzed in a streaming manner. A larger range may indicate a lower confidence in the currently-observed difference than a smaller range, even if the overall confidence interval is a 95% confidence interval in both cases.

In some embodiments, the streaming analysis engine 1006 uses a conversion between confidence intervals and p-values to generate confidence information or portions thereof. The p-value for testing a null hypothesis that a parameter equals $\theta_0$ is the smallest q for which the (1−q)-confidence interval for the parameter fails to cover $\theta_0$. Alternatively, the (1−α)-confidence interval for a parameter is the value $\theta_0$ in the null hypothesis that results in a p-value greater than α.

At decision block 912, the usage analysis subsystem 110 may determine whether the confidence information includes a value indicating the experimental hypothesis is valid. In the case of the null hypothesis, a confidence interval that includes "0" as a possible value indicates that the null hypothesis may still hold: that there is no significant difference between the variants tested in the experiment. If the confidence interval does not include "0," the null hypothesis may be determined to be unlikely to hold.

Additionally, or alternatively, the p-value for the experimental hypothesis may be evaluated. In the case of the null hypothesis, a p-value that falls below a confidence threshold (e.g., 0.05, 0.01, etc.) indicates that any observed variance between variants is unlikely to be due to random chance from the currently-available sample, and therefore a high degree of confidence that the null hypothesis is not correct.

If the confidence information includes the value indicating the experimental hypothesis is valid, the routine 900 may proceed to decision block 914. Otherwise, if the confidence information does not include the value indicating the experimental hypothesis is valid, routine 900 may proceed to block 916.

Figure 11:
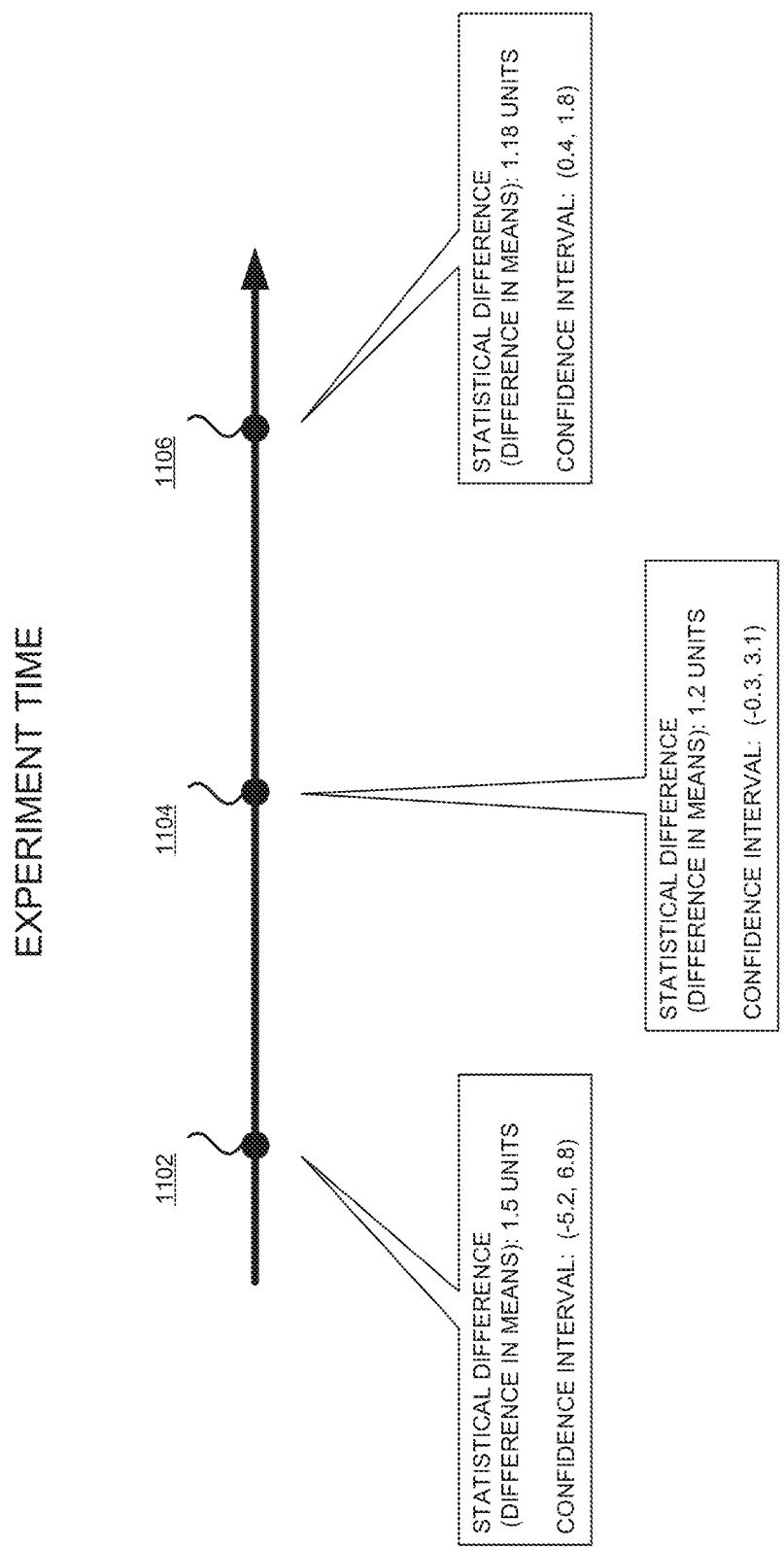
FIG. 11 is a diagram of a timeline depicting illustrative results of streaming analysis of application data generated during an experiment according to some embodiments.

FIG. 11 illustrates examples of statistics, confidence intervals, and experimental hypothesis values during the course of streaming evaluation of experiment data. A time 1102, the streaming analysis engine 1006 may generate a confidence interval for a difference in statistics computed for streaming application data received from a treatment group and a control group up to that point in time. As shown, the difference in the statistic is 1.5 units, and the confidence interval goes from −5.2 to 6.8. Because the confidence interval still includes the null hypothesis (e.g., a difference of 0.0), the experiment may not be stopped unless one or more other stopping criteria are satisfied.

At time 1104, the streaming analysis engine 1006 may generate a confidence interval for a difference in statistics computed for streaming application data received from a treatment group and a control group up to that point in time. As shown, the difference in the statistic is 1.2 units, and the confidence interval goes from −0.3 to 3.1. Because the confidence interval still includes the null hypothesis, the experiment may not be stopped unless one or more other stopping criteria are satisfied.

At time 1106, the streaming analysis engine 1006 may generate a confidence interval for a difference in statistics computed for streaming application data received from a treatment group and a control group up to that point in time.

As shown, the difference in the statistic is 1.18, and the confidence interval goes from 0.4 to 1.8. Because the confidence interval no longer includes the null hypothesis, the experiment may be stopped.

Returning to FIG. 9, at decision block 914 the usage analysis subsystem 110 may determine whether a stopping criterion has been satisfied. In some embodiments, the stopping criterion may relate to the magnitude of the p-value, the size of the confidence interval, quantity of application data items in the available sample, a time period for running the experiment, or some other factor. For example, if the p-value is below a second threshold (e.g., 0.01), if the size of the confidence interval is below a certain magnitude, or if time period for running the experiment has passed, then the stopping criterion may be satisfied.

If the stopping criterion has been satisfied, routine 900 proceeds to block 916. Otherwise, if the stopping criterion has not been satisfied, routine 900 may return to block 904.

At block 916, the usage analysis subsystem 110 can end the experiment and generate a final result. In some embodiments, the final result may include the last computed statistic(s) for the metric(s) and a classification or other indication of the performance of the variance, such as "inconclusive," "poor," "better," and "best." The performance of the variant may be based on an evaluation of the p-value and/or confidence intervals according to one or more experiment result criteria for each performance level. For example, an "inconclusive" result may be one in which the significance level is <95%. A "poor" result may be one in which the significance level is >95%, and either (1) the upper bound of the 95%-confidence interval lies below zero and the metric should increase, or (2) the lower bound of the 95%-confidence interval lies above zero and the metric should decrease. A "better" result may be one in which the significance level is >95%, and either (1) the lower bound of the 95%-confidence interval lies above zero and the metric should increase, or (2) the upper bound of the 95%-confidence interval lies below zero and the metric should decrease. A "best" result may be one in which there are two or more variations in addition to the default/control in the experimental setup, and if the following conditions are met: the variant qualifies for the "better" tag, and either (1) the lower bound of the 95%-confidence interval lies above the upper bound of the 95%-confidence intervals of all other variations and the metric should increase, or the upper bound of the 95%-confidence interval lies below the lower bound of the 95%-confidence intervals of all other variations and the metric should decrease.

In some embodiments, the usage analysis subsystem 110 may provide Bayesian results in addition to frequentist results. While frequentist results may be used to determine when to end an experiment, the significance of the experiment, etc., Bayesian results can advantageously be used to answer questions regarding how likely an improvement in a variation is, even if the desired significance level was not reached.

Bayesian inference can quantify the probability that the statistic in the tested variation (e.g., the mean of the extracted metric) is larger or smaller than the corresponding statistic in the default/control variation. In Bayesian analysis, prior beliefs (referred to as "priors") are updated based on new evidence. Bayesian analysis allows quantification of the probability that the statistic in the tested variation (e.g., mean) is larger or smaller than the statistic in the default/control variation. This may be done by comparing the posterior distributions for the statistic in both variations and computing the probability that, when drawing the statistics according to the posterior distributions, the statistic in one variation is larger than the statistic in the other variation. For example, if, in a streaming video provider's experiment, the probability of increase in an engagement metric is 94%, this means there is 94% certainty that the new variant model leads to more engagement than the old one.

In some embodiments, the Bayesian analyzer 1012 performs Bayesian inference for the statistic of the target metric using "conjugate priors." Using conjugate priors may provide an advantage in that the posterior distribution can be inferred in a computationally efficient way. For an A/B testing experiment with a finite sample of application data items, an interesting question is whether the statistic in the variation is at least x % larger/smaller than the statistic in the default/control variation.

In some embodiments, the results generated by the Bayesian analyzer 1012 may include a "probability of increase" representing the probability that the statistic of the metric in the tested variation is at least x % larger than the statistic in the default/control variation. The results may also include a "probability of decrease" representing the probability that the statistic of the metric in the tested variation is at least x % smaller than the statistic in the default/control variation. The results may also include a "probability of no change" representing the probability that the difference between the statistics of the tested and default/control variation is less than x %. In some implementations, x=3.

In some embodiments, the Bayesian result may include an indication of the performance of the variance, such as "better," "worse," or "warning." The performance of the variant may be based on one or more experiment result criteria for each performance level. For example, the performance is classified as "better" if either (1) the probability of increase is at least 90% and the metric should increase, or (2) the probability of decrease is at least 90% and the metric should decrease. The performance is classified as "worse" if either (1) the probability of decrease is at least 90% and the metric should increase, or (2) the probability of increase is at least 90% and the metric should decrease. The performance is classified as "warning" of inconsistent results between the frequentist and Bayesian frameworks if either (1) the probability of increase is greater than 50% and the statistic of the 95%-confidence interval is smaller than zero, or (2) the probability of decrease is greater than 50% and the statistic of the 95%-confidence interval is greater than zero.

Routine 900 may terminate at block 918.

Although the description above focuses on an example implementation in which application data items are processed in a streaming manner (e.g., as each application data item is received), in some embodiments routine 900 or a variant thereof may be implemented to process application data items in a batch. For example, application data items may be periodically batched and processed every x units of time, where the unit may be defined in terms of seconds, minutes, hours, days, or the like.

In some embodiments, individual application data items may not be maintained as an available sample for computation of statistics when subsequent application data items are received. Instead, the usage analysis subsystem 110 may compute statistics using aggregated data regarding the available sample. For example, the usage analysis subsystem 110 can adjust the mean and variance if application data items arrive in batches, and only the batch mean and batch count are available.

Execution Environment

Figure 12:
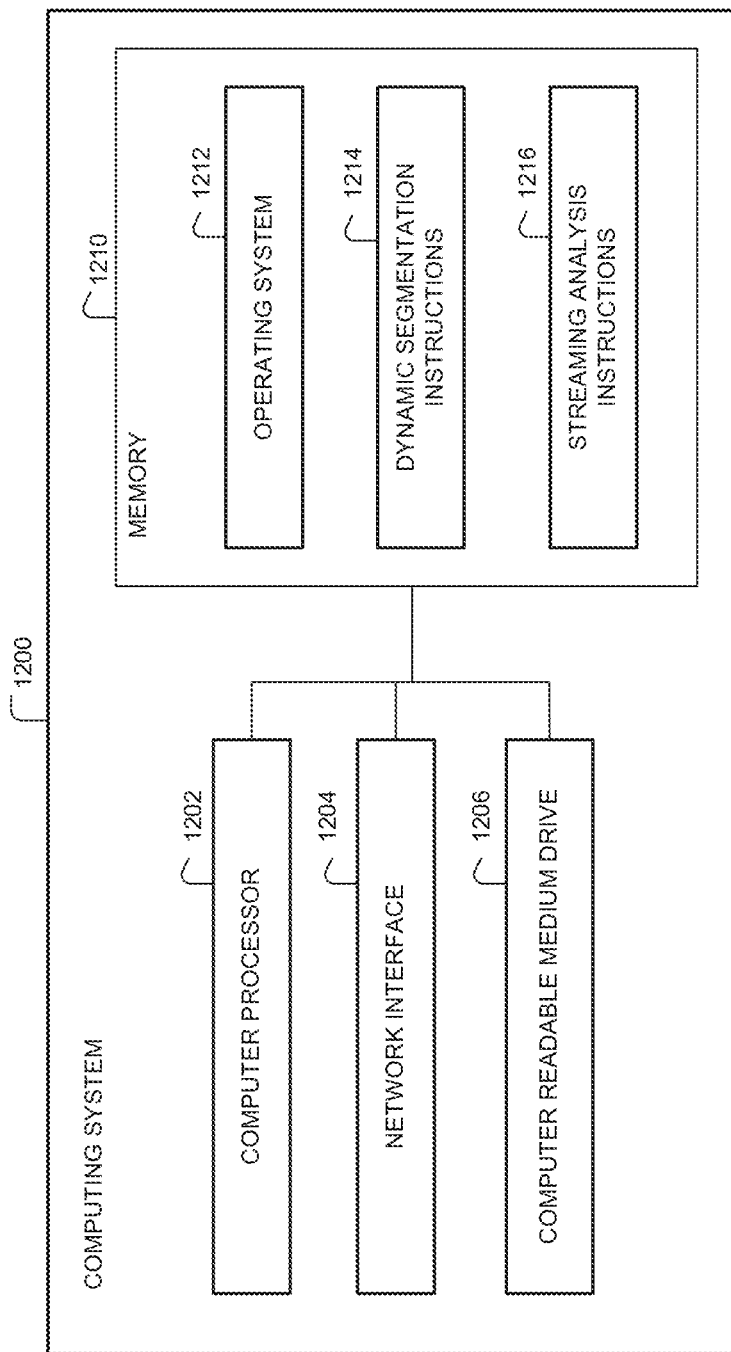
FIG. 12 is a block diagram of an illustrative computing system configured to implement features of some embodiments.

FIG. 12 illustrates various components of an example computing system 1200 configured to implement various functionality described herein. The computing system 1200 may be a physical host computing device on which a usage management system 100 or some portion thereof is implemented.

In some embodiments, as shown, a computing system 1200 may include: one or more computer processors 1202, such as physical central processing units ("CPUs"); one or more network interfaces 1204, such as a network interface cards ("NICs"); one or more computer readable medium drives 1206, such as a high density disk ("HDDs"), solid state drives ("SSDs"), flash drives, and/or other persistent non-transitory computer readable media; and one or more computer readable memories 1210, such as random access memory ("RAM") and/or other volatile non-transitory computer readable media.

The computer readable memory 1210 may include computer program instructions that one or more computer processors 1202 execute and/or data that the one or more computer processors 1202 use in order to implement one or more embodiments. For example, the computer readable memory 1210 can store an operating system 1212 to provide general administration of the computing system 1200. As another example, the computer readable memory 1210 can store dynamic segmentation instructions 1214 for implementing dynamic segmentation of application traffic and determination of cohorts. As another example, the computer readable memory 1210 can store streaming analysis instructions 1216 for implemented streaming analysis of application data.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising one or more computer processors configured to execute specific instructions:
collecting first application data associated with user interactions with an application;
evaluating the first application data to generate a plurality of predicted application actions using a prediction model;
determining, based on results of evaluating the first application data using the prediction model, a first interaction path of the application associated with an undesired action of the plurality of predicted application actions, wherein the first interaction path is associated with a first plurality of application operations;
determining, based on results of evaluating the first application data using the prediction model, a second interaction path of the application associated with a desired action of the plurality of predicted application actions, wherein the second interaction path is associated with a second plurality of application operations;
generating experiment data representing an application experiment, wherein the application experiment comprises substitution of at least one operation associated with the second interaction path for at least one operation associated with the first interaction path;
collecting second application data associated with user interactions with the application based on execution of the application experiment; and
determining an effect of the application experiment based at least partly on the second application data.

2. The computer-implemented method of claim 1, further comprising generating at least a portion of at least one of the first application data or the second application data using a synthetic traffic subsystem configured to mimic use of the application by a user.

3. The computer-implemented method of claim 1, wherein determining the first interaction path associated with the undesired action comprises identifying application session metadata and a sequence of application interactions associated with abandonment of an application session for a threshold period of time.

4. The computer-implemented method of claim 1, wherein determining the second interaction path associated with the desired action comprises identifying application session metadata and a sequence of application interactions associated with one of: execution of a predetermined operation, or an application session extending for a threshold period of time without abandonment.

5. The computer-implemented method of claim 1, further comprising:
determining, based on evaluation of second application data associated with usage of a user interface component, a second predicted application action associated with the user interface component; and
causing display of information representing the second predicted application action.

6. The computer-implemented method of claim 5, wherein causing display of information representing the second predicted application action comprises causing display of the information representing the second predicted application action on a WYSIWYG design interface.

7. The computer-implemented method of claim 1, further comprising receiving at least a portion of the first application data from a monitoring subsystem executing on a user device.

8. The computer-implemented method of claim 7, wherein receiving the portion of the first application data comprises receiving data representing at least one of: click locations, scroll events, data entry, crashes, geographic locations, browser versions, crashes, navigation paths, latency, or communication headers.

9. The computer-implemented method of claim 1, further comprising generating canary data representing synthetic traffic of the application to be generated by a synthetic traffic subsystem, wherein the synthetic traffic of the application is associated with one of the first interaction path or the second interaction path.

10. The computer-implemented method of claim 1, further comprising generating an alert regarding the application experiment, wherein the alert indicates one of: a first failure of the application experiment to reduce a likelihood of the undesired action, or a second failure of the application experiment to increase a likelihood of the desired action.

11. The computer-implemented method of claim 1, further comprising:
obtaining a training data set comprising application data associated with usage of the application;
identifying a first subset of the training data set associated with a desired action of the application;
identifying a second subset of the training data set associated with an undesired action of the application; and
training the prediction model using the first subset of the training data set and the second subset of the training data set.

12. A system comprising:
computer readable memory storing executable instructions; and
one or more processors in communication with the computer readable memory and programmed by the executable instructions to at least:
collect first application data associated with user interactions with an application;

evaluate the first application data to generate a plurality of predicted application actions using a prediction model;

determine, based on results of evaluating the first application data using the prediction model, a first interaction path of the application associated with an undesired action of the plurality of predicted application actions, wherein the first interaction path is associated with a first plurality of application operations;

determine, based on results of evaluating the first application data using the prediction model, a second interaction path of the application associated with a desired action of the plurality of predicted application actions, wherein the second interaction path is associated with a second plurality of application operations;

generate experiment data representing an application experiment, wherein the application experiment comprises substitution of at least one operation associated with the second interaction path for at least one operation associated with the first interaction path;

collect second application data associated with user interactions with the application based on execution of the application experiment; and determine an effect of the application experiment based at least partly on the second application data.

13. The system of claim 12, wherein the one or more processors are further programmed by the executable instructions to generate at least a portion of at least one of the first application data or the second application data using a synthetic traffic subsystem configured to mimic use of the application by a user.

14. The system of claim 12, wherein to determine the first interaction path associated with the undesired action, the one or more processors are further programmed by the executable instructions to identify application session metadata and a sequence of application interactions associated with abandonment of an application session for a threshold period of time.

15. The system of claim 12, wherein to determine the second interaction path associated with the desired action, the one or more processors are further programmed by the executable instructions to identify application session metadata and a sequence of application interactions associated with one of: execution of a predetermined operation, or an application session extending for a threshold period of time without abandonment.

16. The system of claim 12, wherein the one or more processors are further programmed by the executable instructions to:

determine, based on evaluation of second application data associated with usage of a user interface component, a second predicted application action associated with the user interface component; and cause display of information representing the second predicted application action.

17. The system of claim 12, further comprising a monitoring subsystem executing on a user device, wherein the one or more processors are further programmed by the executable instructions to receive at least a portion of the first application data from the monitoring subsystem, wherein the portion of the first application data represents at least one of:

click locations, scroll events, data entry, crashes, geographic locations, browser versions, crashes, navigation paths, latency, or communication headers.

18. The system of claim 12, wherein the one or more processors are further programmed by the executable instructions to generate canary data representing synthetic traffic of the application to be generated by a synthetic traffic subsystem, wherein the synthetic traffic of the application is associated with one of the first interaction path or the second interaction path.

19. The system of claim 12, wherein the one or more processors are further programmed by the executable instructions to generate an alert regarding the application experiment, wherein the alert indicates one of: a first failure of the application experiment to reduce a likelihood of the undesired action, or a second failure of the application experiment to increase a likelihood of the desired action.

20. The system of claim 12, further comprising an experiment management subsystem configured to at least:

determine, for a portion of users associated with the application experiment, to provide a first application experience based on the first interaction path; and determine, for a second portion of users associated with the application experiment, to provide a second application experience based on substitution of the at least one operation associated with the second interaction path for the at least one operation associated with the first interaction path.

* * * * *